US012801819B2

(12) United States Patent
Hu

(10) Patent No.: US 12,801,819 B2
(45) Date of Patent: Nov. 17, 2026

(54) MULTI-HEIGHT CELL LIBRARY DESIGN SOLUTION FOR INTEGRATED CIRCUITS

(71) Applicant: Intel Corporation, Santa Clara, CA (US)

(72) Inventor: Wei-Yi Hu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 69 days.

(21) Appl. No.: 18/080,858

(22) Filed: Dec. 14, 2022

(65) Prior Publication Data

US 2024/0202416 A1 Jun. 20, 2024

(51) Int. Cl.
*G06F 30/392* (2020.01)
*G06F 111/20* (2020.01)

(52) U.S. Cl.
CPC ........ *G06F 30/392* (2020.01); *G06F 2111/20* (2020.01)

(58) Field of Classification Search
CPC ........................... G06F 30/392; G06F 2111/20
USPC ........................................................ 716/100
See application file for complete search history.

(56) References Cited

U.S. PATENT DOCUMENTS 7,503,026 B2 * 3/2009 Ichiryu ................ H10D 84/907 716/122
8,013,367 B2 * 9/2011 Doris ................... H10D 64/027 257/E21.409
8,490,043 B2 * 7/2013 Gupta ................... G06F 30/398 716/135
8,631,377 B2 * 1/2014 Lee ....................... G06F 30/392 716/124
8,788,998 B2 * 7/2014 Hatamian ............. G06F 30/392 716/122
8,949,768 B2 * 2/2015 Gupta ..................... G06F 30/36 716/135
9,871,040 B2 * 1/2018 Shimbo ................ H10D 84/834
10,236,302 B2 * 3/2019 Correale, Jr. ...... H10D 84/0167
10,957,683 B2 * 3/2021 Lee ........................ H10D 89/10
11,263,378 B2 * 3/2022 Ou ........................ G06F 30/392
2005/0198604 A1 9/2005 Yoshida et al.
2012/0249182 A1 * 10/2012 Sherlekar ............. G06F 30/394 716/102
2017/0373090 A1 * 12/2017 Correale, Jr. ...... H10D 84/0167
2023/0097189 A1 * 3/2023 Chen ..................... G06F 30/392 716/119

* cited by examiner

*Primary Examiner* — Suresh Memula
(74) *Attorney, Agent, or Firm* — Arcane Law PLLC

(57) ABSTRACT

An integrated circuit structure includes a plurality of first and second cells, each first and second cell including corresponding two or more transistor devices. Each first cell has a first height. Each second cell has a second height, the second height at least 3 nanometers (nm) different from the first height. The cells are arranged in a plurality of rows, where a row includes a first cell and a second cell. An imaginary line passes through the first cell, and divides the first cell into a first upper portion having a first upper height and a first lower portion having a first lower height that are within 1 nm of each other. The imaginary line also divides the second cell into a second upper portion having a second upper height and a second lower portion having a second lower height that are within 1 nm of each other.

21 Claims, 11 Drawing Sheets

MULTI-HEIGHT CELL LIBRARY DESIGN SOLUTION FOR INTEGRATED CIRCUITS

FIELD OF THE DISCLOSURE

The present disclosure relates to integrated circuits, and more particularly, to designing and forming cells comprising transistor devices for an integrated circuit.

BACKGROUND

In designing and forming integrated circuit structures, standard cell libraries are developed with different cell heights. For example, taller cells with greater cell height and shorter cells with smaller cell height may be designed and developed. Individual cells may be designed to comprise corresponding one or more transistor devices. Taller cells may include larger and/or a higher number of diffusion regions, and shorter cells may include smaller and/or a lower number of diffusion regions, where diffusion regions are source or drain regions of the transistor devices within individual cells. Taller cells may provide higher driving strength, albeit with larger area footprint and power consumption. On the other hand, shorter cells may provide smaller area footprint and lower power consumption, but may have weaker driving strength. Thus, individual cells are designed to be taller or shorter, depending on one or more such criteria. There remain a number of non-trivial challenges with respect to designing layout of various cells of the integrated circuit structure for improved PPA (power, performance, and area) performance.

Figure 1:
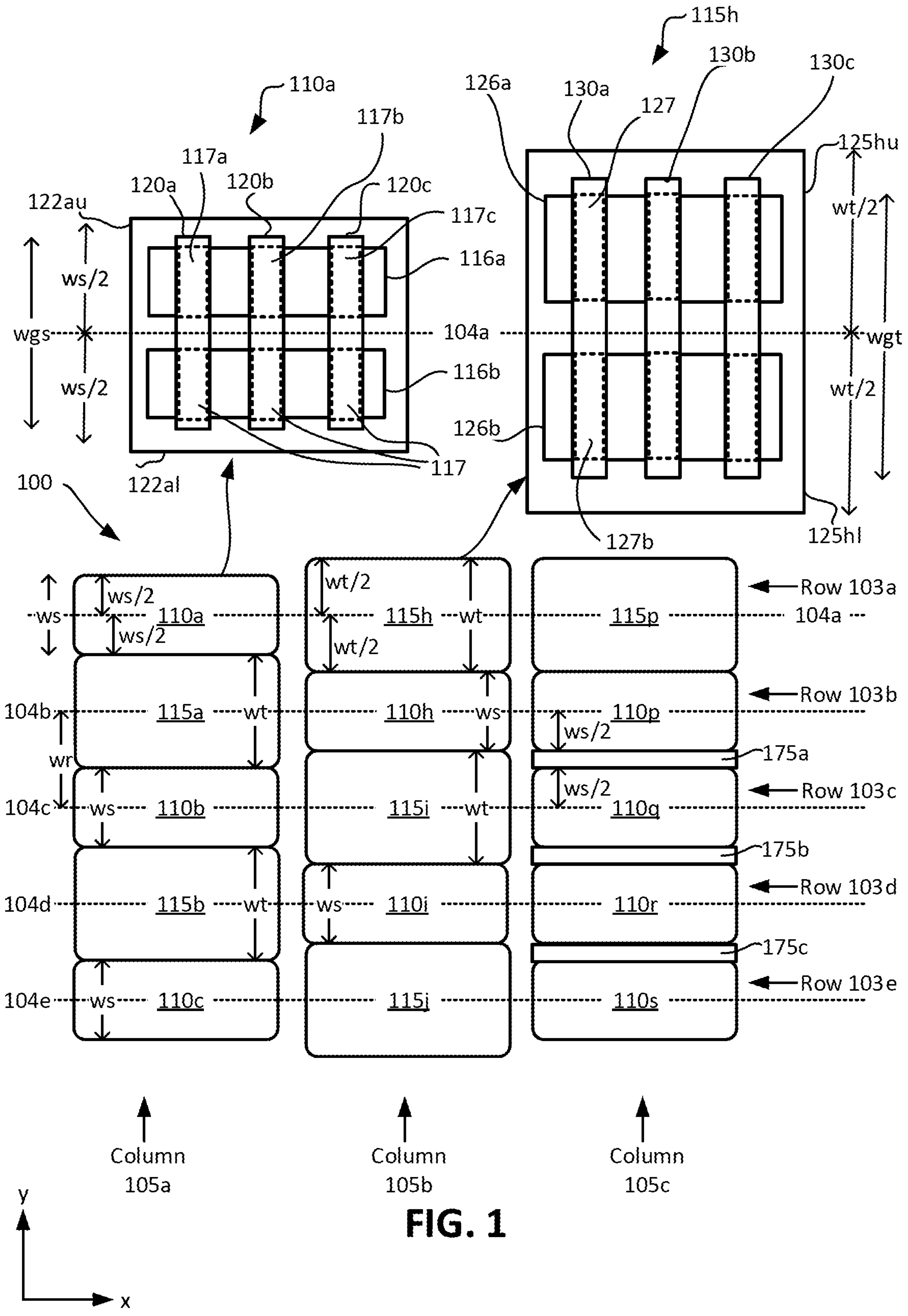
FIG. 1 is a plan view of an integrated circuit structure that includes a plurality of short cells and a plurality of tall cells, wherein each short cell has a substantially similar height ws, wherein each tall cell has a substantially similar height wt, wherein the short and tall cells are arranged in a plurality of rows, such that (i) a row of the plurality of rows includes a tall cell laterally adjacent to a short cell, (ii) an imaginary line passes through the tall cell, and divides the tall cell into an upper portion having an upper tall height that is substantially equal to wt/2 and a lower portion having a lower tall height that is also substantially equal to wt/2, and (iii) the imaginary line passes through the short cell, and divides the short cell into an upper portion having an upper short height that is substantially equal to ws/2 and a lower portion having a lower short height that is also substantially equal to ws/2, and wherein the various upper and lower heights are measured in a direction parallel to the first height and the second height, in accordance with an embodiment of the present disclosure.

As will be appreciated, the figures are not necessarily drawn to scale or intended to limit the present disclosure to the specific configurations shown. For instance, while some figures generally indicate perfectly straight lines, right angles, and smooth surfaces, an actual implementation of an integrated circuit structure may have less than perfect straight lines, right angles (e.g., some features may have tapered sidewalls and/or rounded corners), and some features may have surface topology or otherwise be non-smooth, given real world limitations of the processing equipment and techniques used. Likewise, while the thickness of a given first layer may appear to be similar in thickness to a second layer, in actuality that first layer may be much thinner or thicker than the second layer; same goes for other layer or feature dimensions.

DETAILED DESCRIPTION

Techniques are described for designing and forming cells comprising transistor devices for an integrated circuit. In an example, an integrated circuit structure includes a plurality of tall cells and a plurality of short cells, where each cell comprises two or more corresponding transistors, and where the cells are arranged in a plurality of rows. A tall cell has a greater height than a short cell, where the heights are measured along a length of the gate structures of individual cells, as described below. In an example, a row may include both one or more short cells and one or more tall cells. Including both short cells and tall cells within a given row increases a flexibility in the cell layout, which in turn increases area utilization of the integrated circuit structure. Each cell may be symmetrical about a line of symmetry.

In an example, in a given row, centers of the cells of the row are aligned. For example, for a given row, an imaginary line, also referred to as a central line of the row, passes through cells of the row, and divides individual cells in substantially equal height portions. In this manner, the central line may also be thought of as a line of symmetry. In an example, to enable abutment of tall and short cells within a given row, a power or ground rail conductor of a tall cell and a power or ground rail conductor of a short cell may be colinear and aligned. In some such examples, a common and continuous power or ground rail conductor may be used for both tall and short cells. Numerous configurations and variations will be apparent in light of this disclosure.

General Overview

As mentioned herein above, there remain a number of non-trivial challenges with respect to designing layout of various cells of integrated circuit structures. For example, in a hybrid or multi row height system, cells of the same height are placed in a given row. Thus, a first row may include tall cells (and no short cells), while a second row may include short cells (and no tall cells). Thus, the first row including the tall cells may be a tall row (e.g., having a greater height), and the second row including the short cells may be a short row (e.g., having a smaller height). In an example, conductive rails for providing power and/or ground connections are placed on top and bottom edges of the cells. For example, a tall cell has corresponding rails on top and bottom edges of the tall cell, and a short cell has corresponding rails on top and bottom edges of the short cell. In such an architecture, a tall cell cannot abut a short cell within a given row, as such tall and short cell abutment results in misalignment of the conductive rails of the laterally adjacent tall and short cells. This constraint that a given row can only include tall cells or only include short cells leads to inflexibility in cell placement, which may in turn result in unused space in one or more rows, thereby leading to wasted area and lower PPA (Power, Performance, and Area) performance of the integrated circuit structure.

Accordingly, techniques are described herein to form integrated circuit structures having hybrid or multi-height cell layout, where a given row can include both laterally adjacent tall cells and short cells. Thus, now a tall cell can abut a short cell within a given row, hereby leading to increased flexibility in cell placement, which in turn results in increased area utilization (e.g., less empty space within a row), and higher PPA.

A tall cell has a greater height than a short cell, e.g., greater than at least 3 nm, or at least 5 nm, or at least 7 nm, or at least 10 nm, or at least 15 nm, or at least 20 nm, or at least 25 nm, or at least 30 nm, for example. Various example heights discussed herein are measured along a Y-axis direction in the plan view orientation of FIGS. 1-8. For example, each cell comprises two or more corresponding transistor devices, and the various heights are measured along a length of the gate structures of individual cells. Thus, the height of a cell is not a traditional vertical or Z-axis height—rather, the height of a given cell is a distance between opposing first and second edges of the given cell (e.g., along the Y-axis direction in the plan view of the structure where a top edge of the given cell is closer to the top edge of page depicting the plan view, and a bottom edge of the given cell is closer to the bottom edge of the page depicting the plan view), where a length of a gate structure of the given cell extends away from the first (e.g., bottom) edge and toward the second (e.g., top) edge (or away from the second edge and toward the first edge). Thus, in a given plan view, the Y-axis direction (top-to-bottom of page) of height measurement and the X-axis direction (left-to-right of page) of individual rows of cells are perpendicular to one another.

As described herein, a given row can include both laterally adjacent tall cells and short cells. In one embodiment, the cells within a row have their centers aligned. For example, for a given row, a corresponding imaginary line passes through cells of the row, and divides the cells into substantially equal height portions. The phrase "substantially" is used herein, and for purposes of this disclosure, "A" is substantially equal to "B" implies that A and B differ by at most 1 nanometer (nm) or 2 nm (e.g., A is within 1 or 2 nm of B). In an example, the imaginary line of a row divides each cell of the row (e.g., one or more short cells and/or one or more tall cells of the row) into a corresponding upper portion and a corresponding lower portion, where the upper portion and the lower portion of a cell have substantially equal height (e.g., upper and lower portions of a given cell are symmetrical about the imaginary line and they are equal halves). For example, assume that the height of each tall cell is substantially equal to wt, and the height of each short cell is substantially equal to ws. Thus, in a given row, the imaginary line divides a short cell of a row into an upper portion and a lower portion each having a height of substantially ws/2, and the imaginary line also divides a tall cell of the row into an upper portion and a lower portion each having a height of substantially wt/2. Note that each row has such a corresponding imaginary line, which is also referred to as a central line of the row, as the line of a row passes through a center of cells of the corresponding row.

In a practical cell architecture, the upper portion and the lower portion of a cell are described herein to have "substantially" equal height, as perfectly or absolutely equal height (in nanometer scale) may not be achievable given real world conditions (there may always be a slight or otherwise very small difference, such as 10.1 nm versus 10.2 nm, depending on factors such as resolution of measurement accuracy). Thus, in some examples, the term "substantially" is used for physical cell architectures formed using design methodology described herein. However, in the design of the cell architectures, the upper portion and the lower portion of a cell may have absolutely or perfectly equal height, in theoretical terms. Thus, the term "substantially" used for practical or physical cell architectures described herein may be replaced with "perfectly" or "absolutely" when referring to the design of the cell architectures.

In an example, two adjacent central lines are separated by a distance of ½ (ws+wt), e.g., by an average of the heights of a tall cell and a short cell. In the plan views illustrated in FIGS. 1-8, the rows are arranged along X-axis direction and the central lines also extend along the X-axis direction. Because various examples are discussed herein using plan views, a horizontal direction refers to the direction of the X-axis and is parallel to a length of the rows and parallel to the central lines of the rows. A vertical direction refers to the direction of the Y-axis and is parallel to a length of the gate structures (e.g., a direction in which the heights of the cells are measured). So, the X-axis extends left-to-right on the page depicting a given plan view when properly oriented for visual consumption, and the Y-axis extends top-to-bottom on the page depicting the given plan view when properly oriented for visual consumption.

In an example, one constraint is that no two tall cells can be vertically adjacent in the Y-axis direction. If such was allowed, the central lines of two vertically adjacent cells would be apart by more than ½ (ws+wt)). So, given such a constraint in the Y-axis or vertical direction, a tall cell may be between two short cells, or may be between an empty space (e.g., space filled with dielectric material, but not with any cell) and a short cell, or between two empty spaces.

In an example, in the Y-axis direction, a short cell can be vertically adjacent to a tall cell and/or a short cell. If the short cell and the tall cell are vertically adjacent, a distance between the central lines passing through the tall and short cell would be ½ (ws+wt). However, if two short cells are vertically adjacent, a distance between the central lines passing through the two vertically adjacent short cells would be ½ws+½ws=ws, and would be less than the target distance of ½(ws+wt) between two adjacent central lines. Accordingly, if two short cells are to be vertically adjacent, the two short cells can be vertically separated by a dielectric material, or by empty space, or by a dummy cell (having a very short height), such that the distance between the central lines passing through the two vertically adjacent short cells is maintained at ½ (ws+wt).

As further described below, a diffusion region (e.g., a source or drain region) of a short cell may have a dimension (measured in a direction at which the cell heights are measured) that is less than a dimension of a tall cell, e.g., less than at least 3 nm, or at least 5 nm, or at least 7 nm, or at least 10 nm, or at least 15 nm, or at least 20 nm, or at least 25 nm, or at least 30 nm, for example. Thus, a short cell with shorter diffusion region and a tall cell with a taller diffusion region can be laterally adjacent, e.g., within a same row.

Similarly, a gate structure of a short cell may have a dimension (measured in a direction at which the cell heights are measured) that is less than a dimension of a tall cell, where the dimensions are the lengths of the gate structures in an example. Thus, a short cell with shorter gate structure and a tall cell with a taller gate structure can be laterally adjacent, e.g., within a same row.

In an example, to enable formation of hybrid rows comprising both tall and short cells, conductive rails for power and/or ground connections of short and tall cells in a given row are aligned or colinear. For example, a short cell may have one or more upper transistor devices and one or more lower transistor devices (as viewed in the plan view). Thus, there may be an upper conductive rail for the one or more upper transistor devices of the short cell, and a lower conductive rail for the one or more lower transistor devices of the short cell. The upper conductive rail of the short cell may supply power or ground connection to the upper transistor devices of the short cell, and the lower conductive rail of the short cell may supply power or ground connection to the lower transistor devices of the short cell. Similarly, a tall cell may have a corresponding upper conductive rail and a lower conductive rail. Assume that a first short cell and a first tall cell are in a given row and are laterally adjacent. In some embodiments, the upper conductive rail of the short cell and the upper conductive rail of the tall cell are aligned and are colinear, and extends along the direction parallel to the central line of those cells. In some such embodiments, the tall and the short cell may have a common and continuous upper conductive rail (or discontinuous, yet colinear upper conductive rails). Similarly, in some embodiments, the lower conductive rail of the short cell and the lower conductive rail of the tall cell are aligned and are colinear, and extends along the direction parallel to the central line. Furthermore, in some such embodiments, the lower conductive rail of the short cell and the lower conductive rail of the tall cell may be continuous, to form a common lower conductive rail for both the tall and short cells, although they may be discontinuous but colinear in other examples. Aligning the conductive rails of the short and tall cells allows the short and tall cells to be abutting in the same row.

The use of "group IV semiconductor material" (or "group IV material" or generally, "IV") herein includes at least one group IV element (e.g., silicon, germanium, carbon, tin), such as silicon (Si), germanium (Ge), silicon-germanium (SiGe), and so forth. The use of "group III-V semiconductor material" (or "group III-V material" or generally, "III-V") herein includes at least one group III element (e.g., aluminum, gallium, indium) and at least one group V element (e.g., nitrogen, phosphorus, arsenic, antimony, bismuth), such as gallium arsenide (GaAs), indium gallium arsenide (InGaAs), indium aluminum arsenide (InAlAs), gallium phosphide (GaP), gallium antimonide (GaSb), indium phosphide (InP), gallium nitride (GaN), and so forth. Note that group III may also be known as the boron group or IUPAC group 13, group IV may also be known as the carbon group or IUPAC group 14, and group V may also be known as the nitrogen family or IUPAC group 15, for example.

Materials that are "compositionally different" or "compositionally distinct" as used herein refers to two materials that have different chemical compositions. This compositional difference may be, for instance, by virtue of an element that is in one material but not the other (e.g., SiGe is compositionally different than silicon), or by way of one material having all the same elements as a second material but at least one of those elements is intentionally provided at a different concentration in one material relative to the other material (e.g., SiGe having 70 atomic percent germanium is compositionally different than from SiGe having 25 atomic percent germanium). In addition to such chemical composition diversity, the materials may also have distinct dopants (e.g., gallium and magnesium) or the same dopants but at differing concentrations. In still other embodiments, compositionally distinct materials may further refer to two materials that have different crystallographic orientations. For instance, (110) silicon is compositionally distinct or different from (100) silicon. Creating a stack of different orientations could be accomplished, for instance, with blanket wafer layer transfer. If two materials are elementally different, then one of the material has an element that is not in the other material.

It should be readily understood that the meaning of "above" and "over" in the present disclosure should be interpreted in the broadest manner such that "above" and "over" not only mean "directly on" something but also include the meaning of over something with an intermediate feature or a layer therebetween. As used herein, the term "backside" generally refers to the area beneath one or more semiconductor devices (below the device layer) either within the device substrate or in the region of the device substrate (in the case where the bulk of the device substrate has been removed). Note that the backside may become a frontside, and vice-versa, if a given structure is flipped. To this end, and as will be appreciated, the use of terms like "above" "below" "beneath" "upper" "lower" "top" and "bottom" are used to facilitate discussion and are not intended to implicate a rigid structure or fixed orientation; rather such terms merely indicate spatial relationships when the structure is in a given orientation.

As used herein, the term "layer" refers to a material portion including a region with a thickness. A monolayer is a layer that consists of a single layer of atoms of a given material. A layer can extend over the entirety of an underlying or overlying structure, or may have an extent less than the extent of an underlying or overlying structure. Further, a layer can be a region of a homogeneous or inhomogeneous continuous structure, with the layer having a thickness less than the thickness of the continuous structure. For example, a layer can be located between any pair of horizontal planes between, or at, a top surface and a bottom surface of the continuous structure. A layer can extend horizontally, vertically, and/or along a tapered surface. A layer can be conformal to a given surface (whether flat or curvilinear) with a relatively uniform thickness across the entire layer.

Use of the techniques and structures provided herein may be detectable using tools such as electron microscopy including scanning/transmission electron microscopy (SEM/TEM), scanning transmission electron microscopy (STEM), nano-beam electron diffraction (NBD or NBED), and reflection electron microscopy (REM); composition mapping; x-ray crystallography or diffraction (XRD); energy-dispersive x-ray spectroscopy (EDX); secondary ion mass spectrometry (SIMS); time-of-flight SIMS (ToF-SIMS); atom probe imaging or tomography; local electrode atom probe (LEAP) techniques; 3D tomography; or high resolution physical or chemical analysis, to name a few suitable example analytical tools. For example, in some embodiments, such tools may be used to detect an integrated circuit structure comprising a row of cells including a first cell laterally adjacent to a second cell, and an imaginary line that passes through the first and second cells divides those cells into substantially equal halves, such that each portion has substantially the same height (as viewed in the plan view along the Y-axis). Numerous configurations and variations will be apparent in light of this disclosure.

Architecture

FIG. 1 is a plan view of an integrated circuit structure 100 that includes a plurality of short cells 110 and a plurality of tall cells 115, wherein each short cell 110 has a substantially similar height ws (e.g., within 1 nm of ws), wherein each tall cell 115 has a substantially similar height wt (e.g., within 1 nm of wt), wherein the short and tall cells are arranged in a plurality of rows 103*a*, . . . , 103*e*, such that (i) a row 103*a* of the plurality of rows includes a tall cell 115*h* laterally adjacent to a short cell 110*a*, (ii) an imaginary line 104*a* passes through the tall cell 115*h*, and divides the tall cell 115*h* into an upper portion 125*hu* having an upper tall height that is substantially equal to wt/2 (e.g., within 1 nm or 2 nm of wt/2) and a lower portion 125*hl* having a lower tall height that is also substantially equal to wt/2 (e.g., within 1 nm or 2 nm of wt/2), and (iii) the imaginary line 104*a* passes through the short cell 110*a*, and divides the short cell 110*a* into an upper portion 120*au* having an upper short height that is substantially equal to ws/2 (e.g., within 1 nm or 2 nm of ws/2) and a lower portion 125*al* having a lower short height that is also substantially equal to ws/2 (e.g., within 1 nm or 2 nm of wt/2), and wherein the various upper and lower heights are measured in a direction parallel to the first height and the second height, in accordance with an embodiment of the present disclosure. Note that the various heights are measured in the direction of y-axis of FIG. 1, and will be discussed in further detail herein in turn.

Thus, the structure 100 comprises cells that have relatively short height, and these cells are referred to herein as short cell 110, e.g., short cells 110*a*, . . . , 110*c*, 110*h*, . . . , 110*j*, 110*p*, . . . , 110*s* (generally referred to herein as short cells 110 in singular, or short cells 110 in plural). Each of these cells have substantially the same height of ws. The phrase "substantially" is used herein, and for purposes of this disclosure, "A" is substantially equal to "B" implies that A and B differ by at most 1 nm or 2 nm (e.g., A is within 1 or 2 nm of B). Thus, each of the short cells have a corresponding height that is substantially equal to ws, e.g., within 1 or 2 nm of ws.

Similarly, the structure 100 comprises cells that have relatively tall height, and these cells are referred to herein as tall cells 115, e.g., tall cells 115*a*, 115*b*, 115*h*, 115*i*, 115*j*, 115*p* (generally referred to herein as tall cell 115 in singular, or tall cells 115 in plural). Each of these cells have substantially the same height of wt. Thus, each of the tall cells have a corresponding height that is substantially equal to wt, e.g., within 1 or 2 nm of wt.

In an example, wt is greater than ws by at least 3 nm, or at least 5 nm, or at least 7 nm, or at least 10 nm, or at least 15 nm, or at least 20 nm, or at least 25 nm, or at least 30 nm, for example. Thus, the short cells 110 are shorter in height than the tall cells 115. Note that actual values of wt and ws may depend on technology used to form the various cells, the design of the underlying circuit, and may be implementation specific. In an example, wt may range between 12 nm to 22 nm, whereas ws may range between 8 nm to 18, where wt may be greater than ws, as described herein above.

The short and tall cells 110, 115 are arranged in an array comprising plurality of rows 103*a*, . . . , 103*e* and a plurality of columns 105*a*, . . . , 105*c*. Note that a specific number of short and tall cells 110, 115, a specific number of rows 103, and a specific number of columns 105 are illustrated in FIG. 1, although the structure 100 can include any appropriate number of short and tall cells 110, 115, and similarly any appropriate number of rows 103 and/or columns 105.

For example, during design of the structure, standard cell libraries are developed, having different heights (e.g., either short height or tall height). Individual cells comprise corresponding two or more transistor devices. Taller cells may include larger and/or a higher number of diffusion regions, and shorter cells may include smaller and/or a lower number of diffusion regions, where diffusion regions are source or drain regions of the transistor devices within individual cells, as will be discussed in further detail herein below. Taller cells provide higher driving strength, albeit with larger area footprint and power consumption. On the other hand, shorter cells may provide smaller area footprint and lower power consumption, but may have weaker driving strength. Thus, individual cells are made taller or shorter, depending on design criteria.

FIG. 1 also illustrates an example short cell 110*a* and a laterally adjacent tall cell 115*h* in further detail, where the cells 110*a* and 115*h* are within a same row 103*a*. As illustrated, the short cell 110*a* is divided in an upper half 122*au* and a lower half 122*al* by the imaginary line 104*a*, where each of the upper half 120*au* and the lower half 120*al* have substantially the same height of ws/2 (e.g., the two heights are within 1 or 2 nm of ws/2). Similarly, the tall cell 115*h* is divided in an upper half 125*hu* and a lower half 125*hl* by the imaginary line 104*a*, where each of the upper half 125*hu* and the lower half 125*hl* have substantially the same height of wt/2 (e.g., the two heights are within 1 or 2 nm wt/2).

Referring to the short cell 110*a*, the short cell 110*a* includes one or more diffusion regions, such as a diffusion region 116*a* and a diffusion region 116*b* in the example of FIG. 1. Note that the diffusion region 116*a* is not a continuous diffusion region physically, rather the diffusion region 116*a* is a collection of multiple sections, each section also being a diffusion region, such as a source or drain region. For example, there is a channel region 117*a* extending laterally between a first section and a second section of the diffusion region 116*a*, another channel region 117*b* extending laterally between the second section and a third section of the diffusion region 116*a*, and yet another channel region 117*c* extending laterally between the third section and a fourth section of the diffusion region 116*a*. As discussed, a diffusion region can act as a source and/or drain region of a transistor device. Thus, the diffusion region 116*a* is a collection of four sections or four separate diffusion regions, each of which can be a source or drain region.

In the example of FIG. 1, the short cell 110*a* includes one or more gate structures, such as three gate structures 120*a*, 120*b*, 120*c*. Channel regions 117 extend below the corresponding gate structures, and the channel regions would not be visible in the plan view of FIG. 1. Accordingly, the channel regions 117 are illustrated using dotted lines in FIG. 1. In an example, a first transistor device is formed based on the channel region 117*a* extending between two adjacent sections of the diffusion region 116*a* and the gate structure 120*a*. Similarly, a second transistor device is formed based on the channel region 117*b* extending between two adjacent sections of the diffusion region 116*a* and the gate structure 120*b*. Thus, in the example cell 110*a* of FIG. 1, six transistor devices are formed. For example, a top left transistor device includes the channel region 117*a*, a first section of the diffusion region 116*a* acting as a source (or drain) region, a second section of the diffusion region 116*a* acting as a drain (or source) region, and the gate structure 117*a*.

Similarly, referring to the tall cell 115*h*, the tall cell 115*h* includes one or more diffusion regions, such as a diffusion region 126*a* and a diffusion region 126*b* in the example of FIG. 1, and gate structures 130*a*, 130*b*, 130*c*. Also similar to the short cell 110*a*, the tall cell 115*h* has six transistor devices formed therewithin.

Note that the number of diffusion regions, gate structures, the channel regions, and the number of devices in the short and tall cells, as illustrated in FIG. 1, are mere examples, and other examples may include any other appropriate number of such components. In an example, the short and tall cells include the same number of devices (e.g., as illustrated in FIG. 1), while in other examples of the short and tall cells include different number of devices. For example, a number of diffusion regions in a tall cell may be higher than a number of diffusion regions in a short cell, owing to which the tall cell may have a greater height than a short cell. In another example, the difference in the height of the short and tall cells may be due to a difference in dimensions of the components therewithin.

As mentioned herein above, the various heights ws, wt are measured in the direction of y-axis of FIG. 1. For example, the heights are measured along a length of the gate structures 120*a*, . . . , 120*c*, 130*a*, . . . , 130*c*. Thus, the height of a cell is not a traditional vertical or Z-axis height—rather, the height of a given cell is a distance between opposing first and second edges of the given cell (see plan view of FIG. 1), where a length of a gate structure of the given cell extends away from the first edge and toward the second edge (or away from the second edge and toward the first edge). As illustrated, a gate structure extends over semiconductor channel regions 117 (or 127) of the two or more transistor devices of the given cell. The direction of the heights of the cells is perpendicular to a direction of the imaginary lines 104.

In an example, each of semiconductor transistor devices within a cell may be metal oxide semiconductor (MOS) transistors, such as non-planar MOS, e.g., tri-gate (e.g., finFET) or gate-all-around (GAA) transistors, although other transistor topologies and types could also benefit from the techniques provided herein. For example, channel regions 117, 127 may comprise GAA channel structures such as nanoribbons, nanowires, or nanosheets. In another example, a channel structure may comprise a fin-based structure, to form a finFET device. In yet another example, the transistor devices are forksheet transistor devices. The semiconductor material of channel regions 117, 127 may be formed from a substrate (not illustrated in FIG. 1). In some embodiments, the transistor devices within a cell may each include semiconductor regions in the shape of fins that can be, for example, native to the substrate (formed from the substrate itself), such as silicon (Si) fins etched from a bulk silicon substrate. Alternatively, the fins can be formed of material deposited onto an underlying substrate. In one such example case, a blanket layer of silicon germanium (SiGe) can be deposited onto a silicon substrate, and then patterned and etched to form a plurality of SiGe fins extending from that substrate. In another such example, non-native fins can be formed in a so-called aspect ratio trapping based process, where native fins are etched away so as to leave fin-shaped trenches which can then be filled with an alternative semiconductor material (e.g., group IV or III-V material). In still other embodiments, the fins include alternating layers of material (e.g., alternating layers of silicon and SiGe) that facilitates forming of GAA channel regions (such as nanoribbons) during a gate forming process where one type of the alternating layers is selectively etched away so as to liberate the other type of alternating layers within the channel region, so that a GAA process can then be carried out. Again, the alternating layers can be blanket deposited and then etched into fins or deposited into fin-shaped trenches. In an example, the nanoribbons comprise an appropriate semiconductor material, such as silicon (Si), silicon germanium (SiGe), or another appropriate semiconductor material.

According to some embodiments, the diffusion regions 116, 126 are epitaxial regions that are provided using an etch-and-replace process. In other embodiments the diffusion regions (e.g., which are configured as source or drain regions for individual transistor devices) could be, for example, implantation-doped native portions of the semiconductor fins or substrate. Any semiconductor materials suitable for source and drain regions can be used (e.g., group IV and group III-V semiconductor materials). Source or drain regions may include multiple layers such as liners and capping layers to improve contact resistance. In any such cases, the composition and doping of source or drain regions may be the same or different, depending on the polarity of the transistors. In an example, for instance, some of the devices can be p-type MOS (PMOS) transistors, some other devices can be n-type MOS (NMOS) transistors. For example, in the short cell 110*a*, the transistor devices formed on the diffusion regions 116*a* can be one of PMOS or NMOS devices, and the transistor devices formed on the diffusion regions 116*b* can be the other of PMOS or NMOS devices. Similarly, in the tall cell 115*h*, the transistor devices formed on the diffusion regions 126*a* can be one of PMOS or NMOS devices, and the transistor devices formed on the diffusion regions 126*b* can be the other of PMOS or NMOS devices.

In an example, a length of the gate structures 117 of the short cells 110 is substantially wgs, and a length of the gate structures 127 of the tall cells is substantially wgt, as labelled in FIG. 1. In an example and as illustrated in FIG. 1, wgt is greater than wgs, e.g., by at least 2 nm, or at least 4 nm, or at least 6 nm, or at least 8 nm, or at least 10 nm, or at least 15 nm, or at least 20 nm, or at least 25 nm, or at least 30 nm, for example. As discussed, the imaginary line 104*a* passes through a mid-section of each of the gate structures 117, 127, such that the imaginary line 104*a* divides each of the gate structures 117, 127 in two substantially equal-height sections (e.g., assuming that the gate structure doesn't have a gate cut, which is discussed herein below).

As also illustrated, the imaginary line 104*a* is substantially equal distance from the diffusion regions 116*a*, 116*b* of a given short cell 110, and is also substantially equal distance from the diffusion regions 126*a*, 126*b* of a given tall cell, in an example. Accordingly, each imaginary line 104 is also referred to as "diffusion keep-away line" or a "central line" of cells within the given row 103. In an example, a distance wr between two adjacent central line 104 is substantially equal to an average height of a short cell and a tall cell. Thus, $$wr=\tfrac{1}{2}(ws+wt) \qquad \text{Equation 1.}$$

As illustrated, in each row, there may be one or more short cells 110 and/or one or more tall cells 115. Referring now to the column 105*a*, for a given column, a tall cell 115*a* may be vertically (e.g., along the Y-axis) between two short cells. For example, the tall cell 115*a* is vertically between short cells 110*a* and 110*b*, the tall cell 115*b* is vertically between short cells 110*b* and 110*c*, and the tall cell 115*i* is vertically between short cells 110*h* and 110*i*. Thus, along the vertical axis, in an example, no two tall cells can be vertically adjacent to each other—rather, the tall and short cells occur in alternate manner. This in to ensure that each central line 104*a*, 104*b*, . . . , 104*e* always pass through mid-sections of corresponding cells, and the distance wr is maintained between adjacent central lines 104. For example, if two tall cells are vertically adjacent, then the two corresponding central lines would be at a distance that is greater than the distance wr of equation 1. Accordingly, to maintain the distance wr between adjacent central lines 104, in a given column, a tall cell is vertically between two short cells (or between an empty space and a short cell, or between an empty space above and an empty space below), but cannot be vertically adjacent to another tall cell.

However, in an example, in a given column, two short cells can be vertically adjacent, such as vertically adjacent short cells 110*p*, 110*q*, 110*r*, and 110*s* in the column 105*c*. For example, referring specifically to the short cells 110*p* and 110*q*, a distance between the line 104*b* and a lower edge of the cell 100*p* is substantially equal to ws/2, and a distance between the line 104*c* and an upper edge of the cell 100*q* is also substantially equal to ws/2, where the lower and upper edges are relative to the Y axis in the plan view of FIG. 1. However, the distance between lines 104*b* and 104*c* is wr, which is equal to ½ (ws+wt), see equation 1. As ws is less than wt, the lower half of short cell 110*p* and the upper half of short cell 110*q* cannot cover the distance between the lines 104*b* and 104*c*. Accordingly, in an example, there is a space between the short cell 110*p* and 110*q* that cannot be covered by either of the short cells. The space vertically between the short cell 110*p* and 110*q* is filed with component 175*a* in FIG. 1. Component 175*a* can be any component that has a non-functional role in the structure 100. In one example, the component 175*a* can be empty space or dielectric material. In another example, the component 175*a* can be a non-functional dummy cell. A height of the component 175*a* is substantially equal to ½ (ws+wt)−½ws−½ws=½ wt−½ws. Thus, the component has a height that is substantially shorter than a height of a short cell 110 or a tall cell 115. The components 175 are introduced in the structure, e.g., in order to maintain uniform spacing of wr between two adjacent lines 104.

Note that similar to the component 175*a*, a component 175*b* is between short cells 110*q* and 110*r*, and a component 175*c* is between short cells 110*r* and 110*s*, where each of the components 175*a*, 175*b*, 175*c* is empty space, an appropriate dielectric material, or a dummy cell. A dummy cell, as the name suggests, may include one or more non-functional or dummy transistor devices.

Thus, referring now to the columns 105*a*, . . . , 105*c*, in an example, in a given column, a tall cell 115 may appear vertically between two short cells, but no two tall cells may be vertically adjacent to each other, e.g., in order to maintain uniform spacing of wr between two adjacent lines 104. In contrast, two short cells can be vertically adjacent to each other, such as short cells 110*p* and 110*q*, but separated by a corresponding component 175 that is one of a dielectric material or a dummy cell. Note that if a short cell and a tall cell are vertically adjacent in a given column, no such component 175 may be between the short and tall cells.

Figure 2:
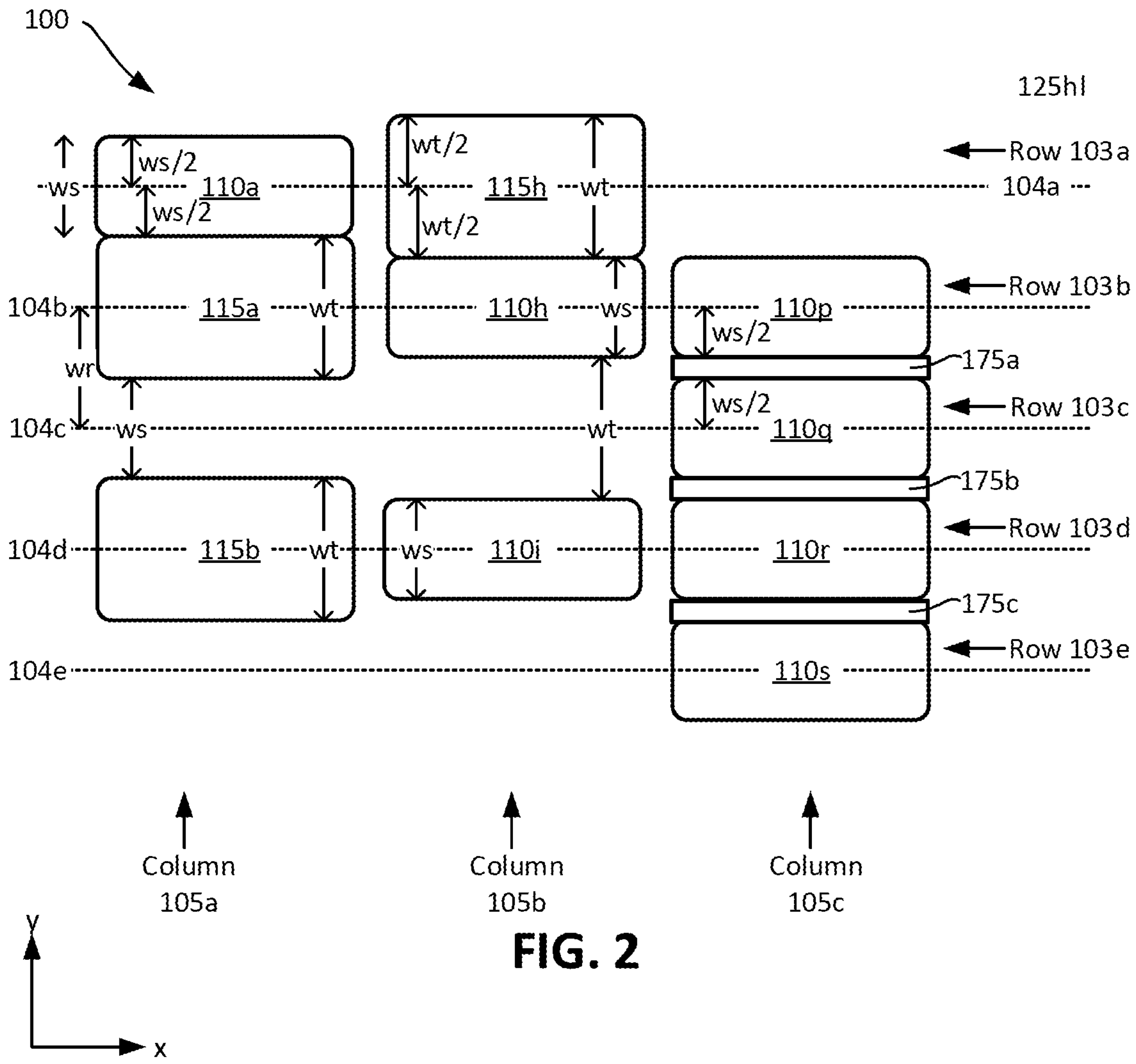
FIG. 2 illustrates the integrated circuit structure of FIG. 1, with one or more short and/or tall cells of FIG. 1 absent in FIG. 2, in accordance with an embodiment of the present disclosure.

Note that although FIG. 1 illustrates no empty space within the structure (e.g., all rows and columns are completely full of cells). However, depending on a design of the underlying circuit, one or more cells may be absent from the structure 100. For example, FIG. 2 illustrates the structure 100 of FIG. 1, with one or more short and/or tall cells of FIG. 1 absent in FIG. 2, in accordance with an embodiment of the present disclosure. Thus, FIG. 2 illustrates a tall cell 115*a* being vertically between a short cell 110*a* and an empty space (which may be filled with dielectric material, for example). Similarly, another tall cell 115*b* is vertically between empty spaces (which may be filled with dielectric material, for example). The choice of the structure in FIG. 1 or FIG. 2 may be based on the design layout, and may be implementation specific.

Figure 3:
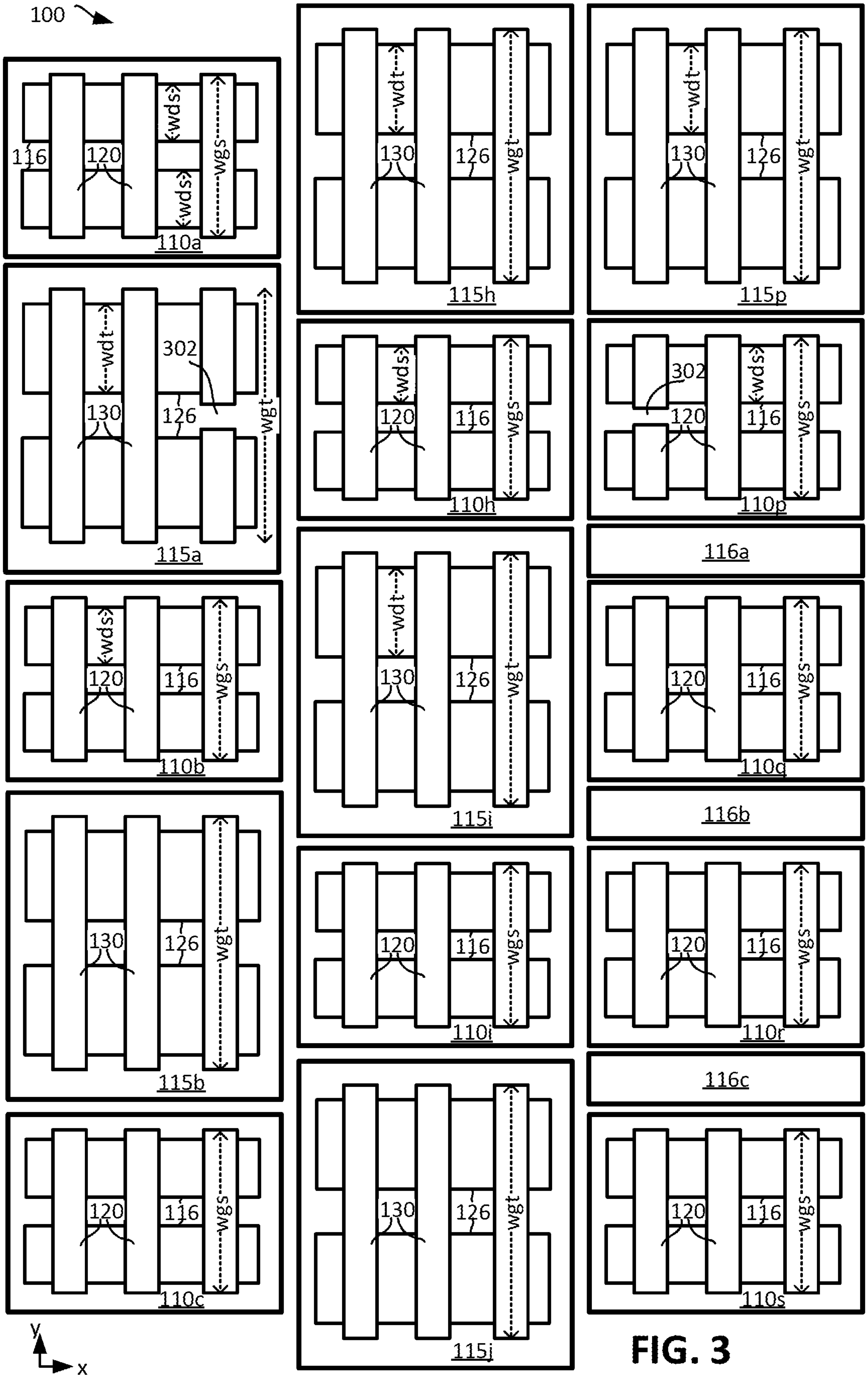
FIG. 3 illustrates gate structures and diffusion regions of various short cells and tall cells of the structure 100 of FIG. 1, in accordance with an embodiment of the present disclosure.

FIG. 3 illustrates gate structures and diffusion regions of various short cells 110 and tall cells 115 of the structure 100 of FIG. 1, in accordance with an embodiment of the present disclosure. Note that unlike FIG. 1 that illustrates the channel regions with dotted lines, the channel regions below the gate structures are not illustrated in FIG. 3. Each short cell 110 includes two diffusion regions 116 (note that each diffusion region has various sections corresponding to various transistor devices, as discussed herein above with respect to FIG. 1), and three gate structures 120, thereby forming six transistor devices per short cell 110. Similarly, each tall cell 115 includes two diffusion regions 126 (note that each diffusion region has various sections corresponding to various transistor devices), and three gate structures 130, thereby forming six transistor devices per tall cell 150. Note that in one example, a cell may have a higher (e.g., three) or lower (e.g., one) number of diffusion regions, and/or a higher (e.g., four) or lower (e.g., one or two) number of gate structures.

In an example, one or more of the gate structures illustrated in FIG. 3 may include a gate cut. For example, a gate structure 130 of a tall cell 115*a* has a gate cut 302, which comprises a dielectric material dividing a gate structure in two electrically isolated sections. Similarly, a short cell 110*p* also has a gate cut 302 within the gate structure 120. The gate cuts may be implemented based on a circuit design and layout of the structure 100, and a number of the gate cuts 302 and/or locations of the gate cuts 302 may be implementation specific.

As illustrated in FIGS. 1 and 3, in a given row, a sort cell (such as sort cell 110*a*) may be adjacent to a tall cell (such as tall cell 115*h*). As illustrated in FIGS. 1 and 3, short cells may have a gate height of wgs, whereas tall cells may have a gate height of wgs. Thus, cells with short gate height wgs and cells with tall gate height wgt may be within a same row and laterally adjacent, as illustrated.

FIG. 3 also illustrates that the heights of the diffusion regions 120 of the short cells 110 is substantially equal to wds, whereas the heights of the diffusion regions 126 of the tall cells 115 is substantially equal to wdt. In an example, wdt is greater than wds, e.g., by at least 2 nm, or at least 4 nm, or at least 6 nm, or at least 8 nm, or at least 10 nm, or at least 12 nm, or at least 15 nm, or at least 20 nm, for example. Thus, short cells with short diffusion region height wds and tall cells with tall diffusion region height wdt may be within a same row, as illustrated.

Figure 4:
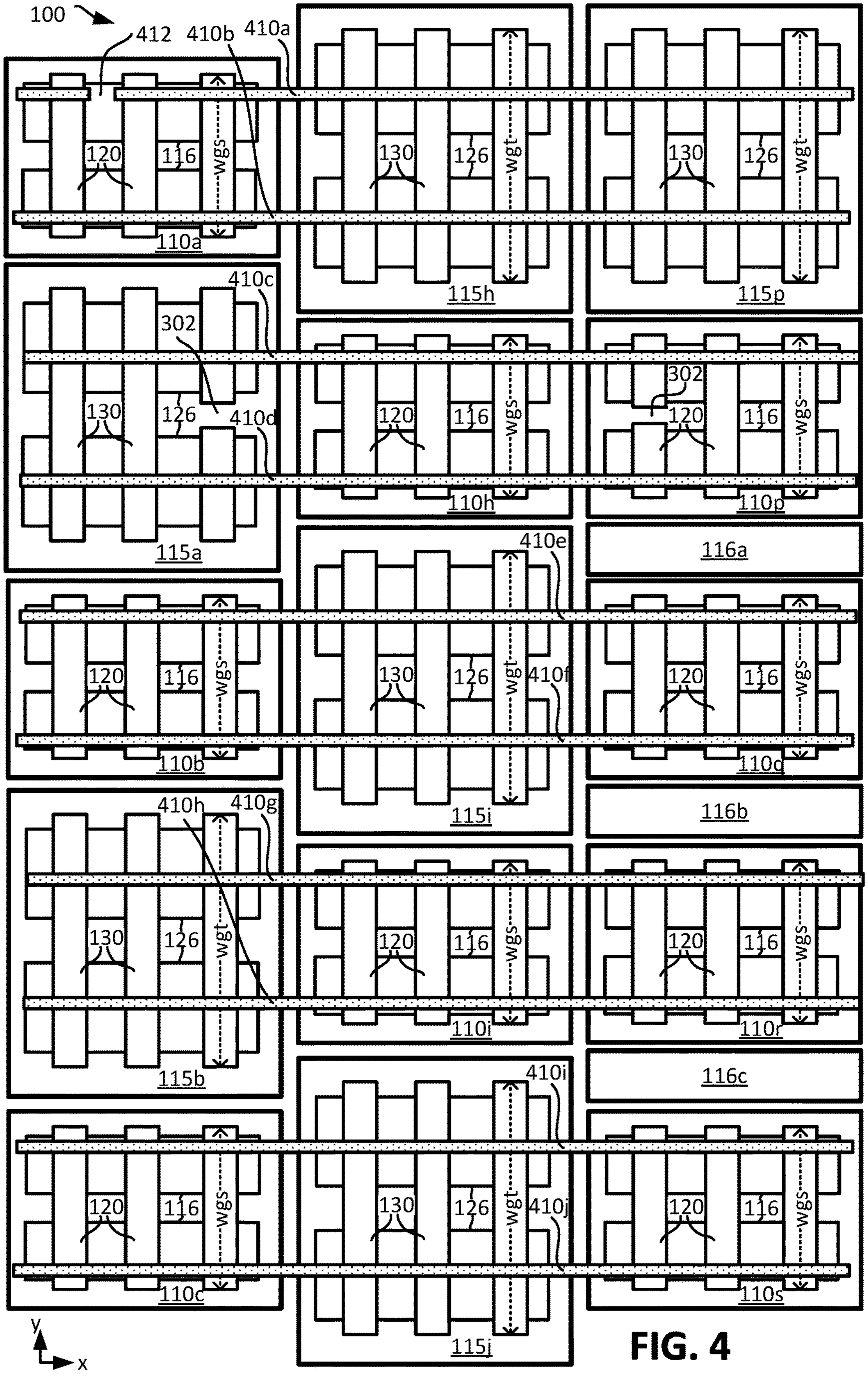
FIG. 4 illustrates the integrated circuit structure of FIG. 1, along with power and/or ground rail conductors of a given row of cells being laterally aligned or colinear, where the power and/or ground rail conductors are on a frontside or above various devices of the cells, in accordance with an embodiment of the present disclosure.

FIG. 4 illustrates the integrated circuit structure 100 of FIG. 1, along with power and/or ground rail conductors 410 of a given row of cells being laterally aligned or colinear, where the power and/or ground rail conductors 410 are on a frontside or above various devices of the cells, in accordance with an embodiment of the present disclosure. For example, the structure 100 of FIG. 4 has a plurality of rail conductors (also referred to simply as rails) 410, where each row has two corresponding rail conductors. For example, the first or top row comprising cells 110*a*, 115*h*, 115*p* has a corresponding first rail 410*a* and a corresponding second rail 410*b*; the second row comprising cells 115*a*, 110*h*, 110*p* has a corresponding first rail 410*c* and a corresponding second rail 410*d*, and so on, as illustrated in FIG. 4.

A rail 410 may act as a power rail or a ground rail, e.g., to supply power or ground connection to the transistor devices of the corresponding cells. For example, the cell 110*a* has three top transistor devices and three bottom transistor devices (e.g., see discussion with respect to FIG. 1), where the rail 410*a* is the power rail for the six transistor devices and the rail 410*b* is the ground rail for the six transistor devices (or where the rail 410*a* is the ground rail for the six transistor devices and the rail 410*b* is the power rail for the six transistor devices). As illustrated, in an example, the rails 410 extend in a direction parallel to the imaginary lines 104 of FIG. 1, e.g., along the X-axis direction, and is perpendicular to a direction in which the various heights are measured.

Figure 4A:
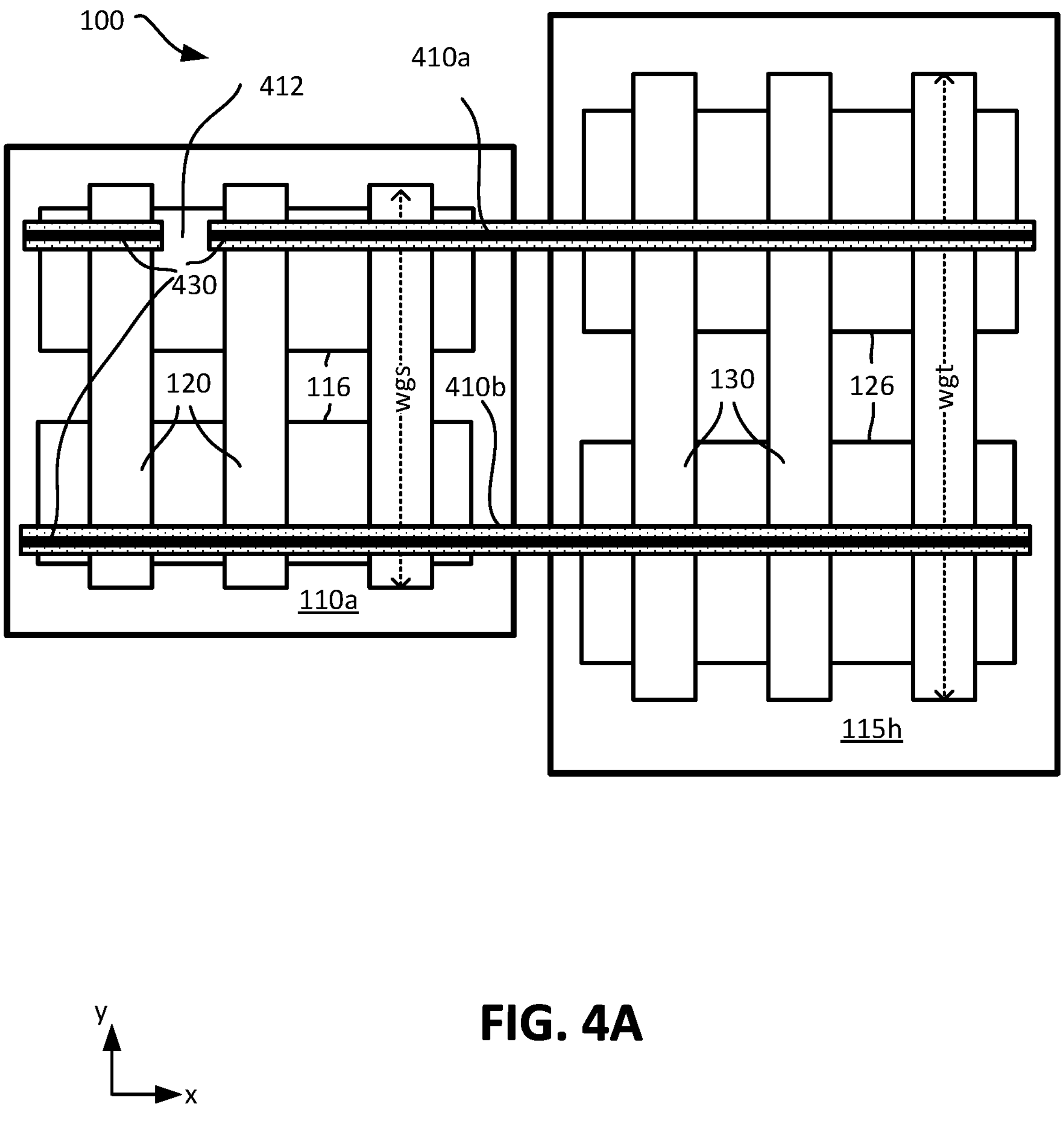
FIG. 4A illustrates a section of the integrated circuit structure of FIG. 4, along with conductive structures to couple the transistor devices with the power and/or ground rail conductors, in accordance with an embodiment of the present disclosure.
Figure 5:
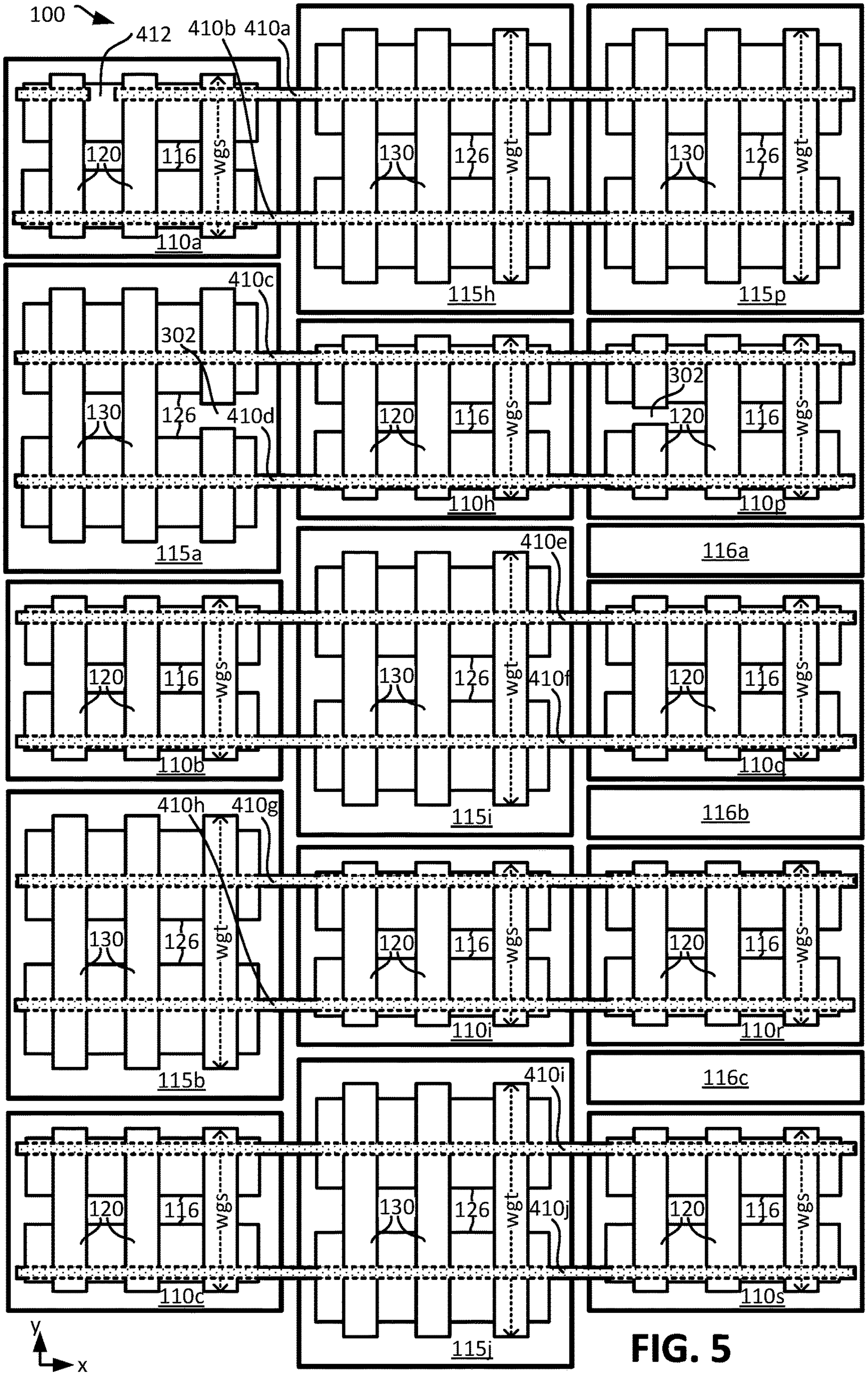
FIG. 5 illustrates the integrated circuit structure of FIG. 1, along with power and/or ground rail conductors of a given row of cells being laterally aligned or colinear, where the power and/or ground rail conductors are on a backside or below various devices of the cells, in accordance with an embodiment of the present disclosure.

FIG. 4A illustrates a section of the integrated circuit structure 100 of FIG. 4, along with conductive structures 430 to couple the transistor devices with the power and/or ground rail conductors 410, in accordance with an embodiment of the present disclosure. For example, the conductive structures 430 couple a diffusion region of a transistor to the corresponding rail 410. The conductive structures 410 are between the corresponding diffusion regions 116, 126 and the rails 410. The rails 410 and the conductive structures 430 are on different planes than the diffusion regions and the gate structures of the various cells. In the example plan view of FIG. 4, the rails 410 and the conductive structures 430 are illustrated above the diffusion regions and the gate structures of the various cells. Thus, in the example of FIG. 4, the rails 410 and the conductive structures 430 are on a frontside or above the devices within the cells. In contrast, FIG. 5 illustrates the integrated circuit structure 100 of FIG. 1, along with power and/or ground rails 410 of a given row of cells being laterally aligned or colinear, where the power and/or ground rails 410 are on a backside or below various devices of the cells, in accordance with an embodiment of the present disclosure. Thus, at least sections of the rails in FIG. 5, which are below the devices of the cells, are illustrated using dotted lines, to schematically signify that the rails 410 will be covered by (e.g., above) the devices of the cells. Note that the conductive structures 430 are not illustrated in FIG. 5, although the conductive structures 430 may be present below the devices and above the rails 410.

Referring to FIGS. 4 and 5, while some of the rails are shown to be continuous rails, in an example, there may be discontinuity within a given rail, such as discontinuity 412 within the rail 410*a*. Locations and/or number of such discontinuities are implementation specific. However, with or without any such discontinuity, a rail 410 of a given row is aligned or colinear. For example, an imaginary straight line passes through the power rail 410*a* of top devices of cells within a given row, and another imaginary straight line passes through the power rail 410*b* of bottom devices of cells within the given row.

Aligning the rails of short cells and tall cells of a given row facilitates in proper placement of the rails for a row that has both short cells and tall cells. Without such alignment, placing both short and tall cells with a given row would have resulted in complex and unsatisfactory rail design. Thus, the rails of short and tall cells of a given row being aligned facilitates lateral abutment of short and tall cells within a given row.

In an example, for a given device of a given cell of a given row, a section of a diffusion region (or a gate structure) may contact the corresponding rail 410. Thus, a rail either supplies power to the transistor device, or grounds the transistor device (or may not be coupled to the transistor device), e.g., depending on the implementation of the structure 100. Thus, the rails 410 may form a power net or a ground net of the devices of the cells of the structure 100. As illustrated, a rail 410 (such as rail 410*a*) is aligned to, e.g., is either above (see FIG. 4) or below (see FIG. 5), the diffusion regions 116 of short cells and diffusion regions 126 of tall cells within a given row. Note that a rail 410 (such as rail 410*a*) is also aligned to, e.g., is either above (see FIG. 4) or below (see FIG. 5), the gate structures 120 of short cells and gate structures 130 of tall cells within a given row. Thus, the rails overlay or is under diffusion regions and gate structures of both tall and short cells of a given cell row.

Figure 6:
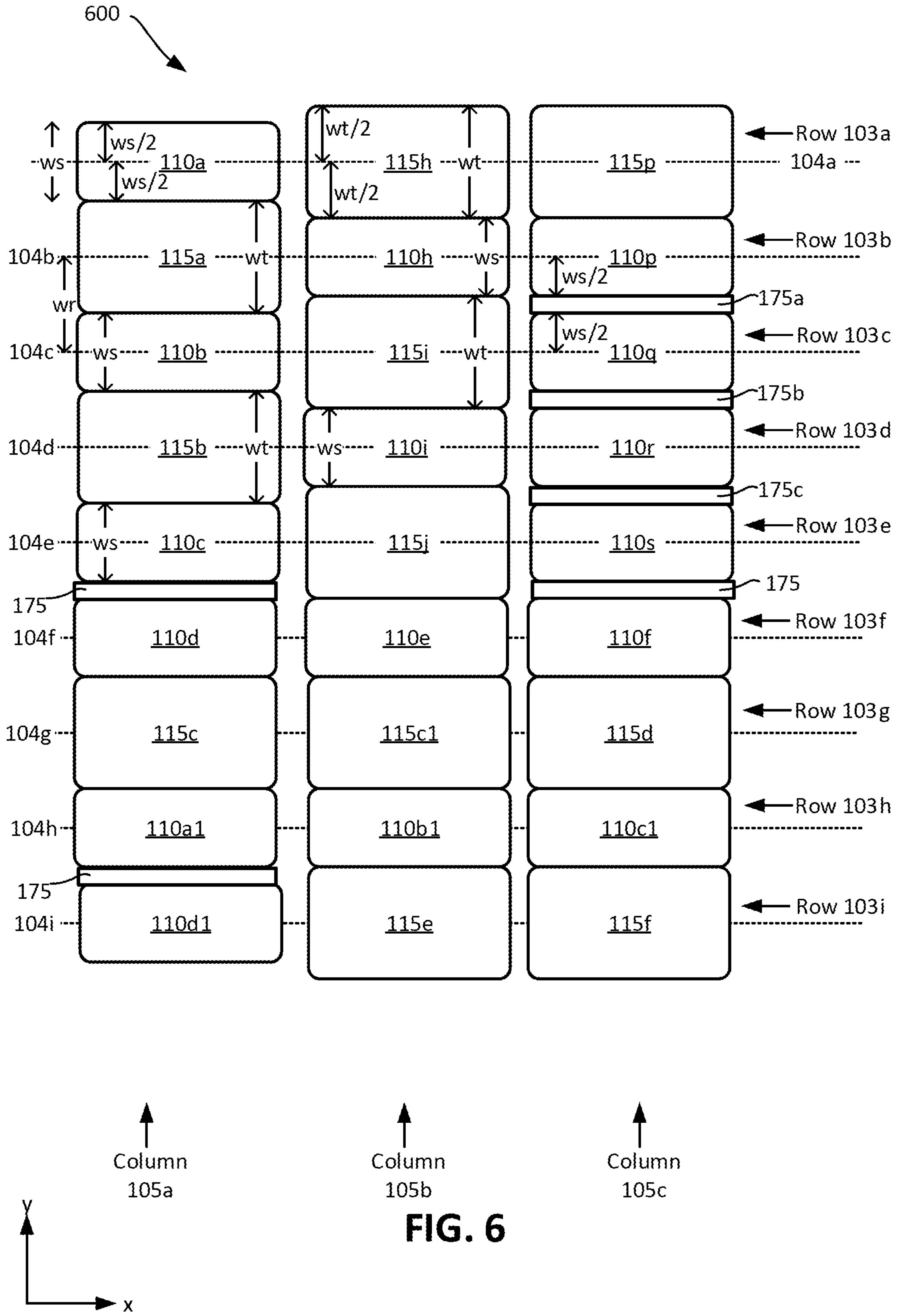
FIG. 6 illustrates a plan view of an integrated circuit structure that is at least in part similar to the integrated circuit structure of FIG. 1, and that includes two rows each including all short cells (and excluding any tall cell), one row including all tall cells (and excluding any short cell), and six rows including both short and tall cells, in accordance with an embodiment of the present disclosure.

FIG. 6 illustrates a plan view of an integrated circuit structure 600 that is at least in part similar to the integrated circuit structure 100 of FIG. 1, and that includes a first row 103*f* including all short cells (and excluding any tall cell), a second row 103*g* including all tall cells (and excluding any short cell), and a third row 103*a* including short and tall cells, in accordance with an embodiment of the present disclosure. Note that no two vertically adjacent rows can have all tall cells, so as to maintain distance between two adjacent rows at ½(ws+wt), as discussed with respect to equation 1 herein above. However, two vertically adjacent rows can have all short cells (there may be components 175 between two such rows). In an example, row 103*g* has all short cells. But each of rows 103*f* and 103*h*, which are vertically adjacent to the row 103*g*, doesn't include any tall cell. Accordingly, distances between two rows are maintained at ½(ws+wt), as discussed with respect to equation 1 herein above.

Figure 7:
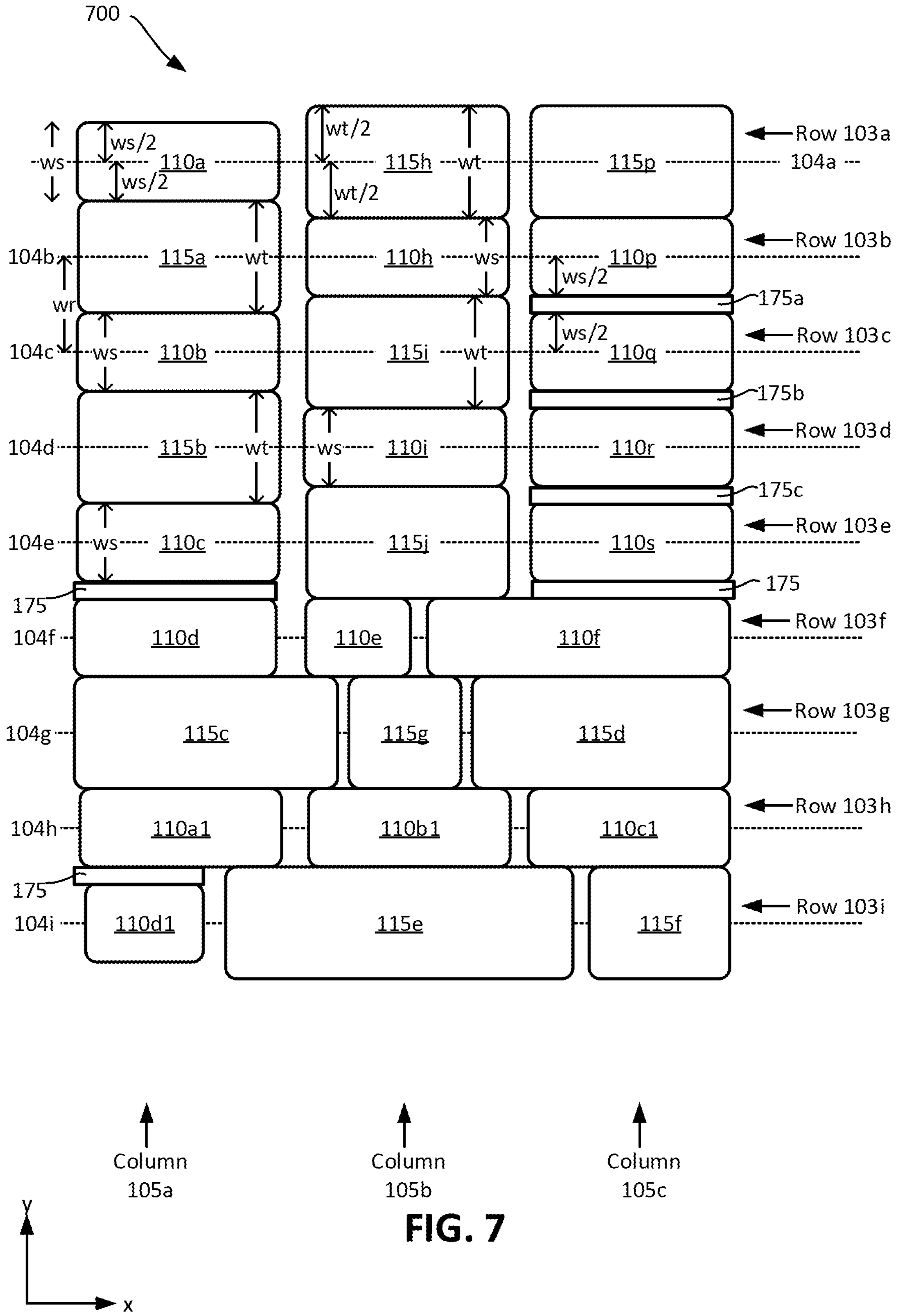
FIG. 7 illustrates a plan view of an integrated circuit structure that is at least in part similar to the integrated circuit structure of FIG. 6, and that includes tall and short cells having different widths, such that the cells are arranged in rows, but not necessarily in columns, in accordance with an embodiment of the present disclosure.

FIG. 7 illustrates a plan view of an integrated circuit structure 700 that is at least in part similar to the integrated circuit structure 600 of FIG. 6, and that includes tall and short cells having different widths (where the widths are measured in X axis direction that is perpendicular to a direction of Y axis along which height is measured), such that the cells are arranged in rows, but not necessarily in columns, in accordance with an embodiment of the present disclosure. The widths are measured in a direction of the imaginary lines 104 of FIG. 1. FIG. 7 will be apparent, based on the discussion herein above with respect to FIGS. 1-6.

Figure 8:
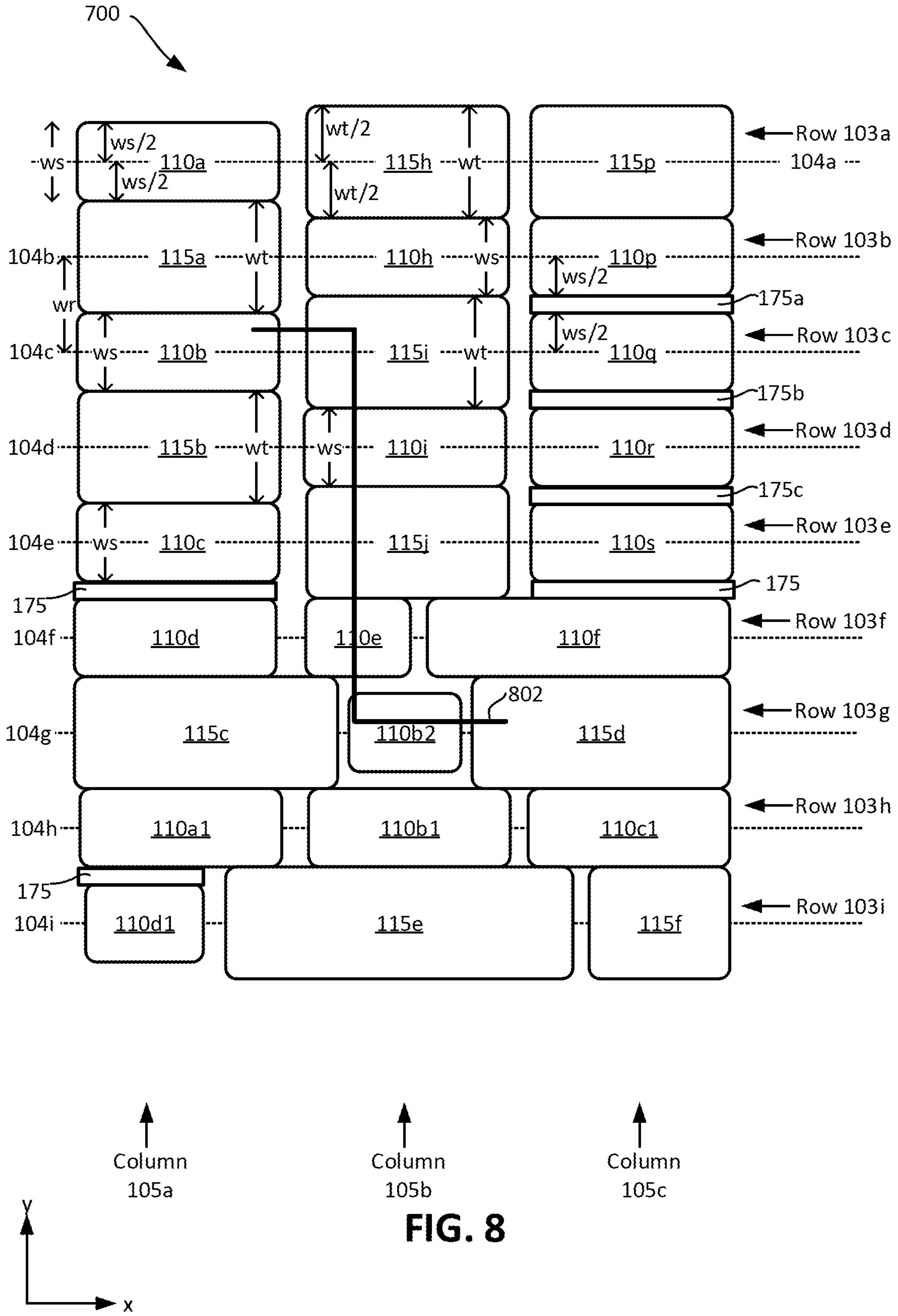
FIG. 8 illustrates a plan view of the integrated circuit structure of FIG. 7, and further schematically illustrates an example routing between two example cells, in accordance with an embodiment of the present disclosure.

FIG. 8 illustrates a plan view of the integrated circuit structure 700 of FIG. 7, and further schematically illustrates an example routing 802 between two example cells 110*b* and 115*d*, in accordance with an embodiment of the present disclosure. For example, in the structures 100, 600 and 700 discussed herein, in a given row, any cell (e.g., short or tall) can be abutting any other cell (e.g., short or tall). This increases a flexibility in placing the cells within the structure, resulting in decreasing an overall space to fit all the cells of the structure. Because of the flexibility in placing the short and tall cells within the structure, area utilization of the structure improves, thereby increasing a PPA (Power, Performance, and Area) of the structures discussed herein.

Note that in a structure employing only tall or only short cells in a given row, an origin of cell placement used to design and/or form the cells is usually at a cell left-bottom point. For example, a cell design tool (such as that used in an Electronic design automation (EDA) tool) starts to form a given row of cell, by defining a cell left-bottom point within a given row. In contrast, the origin of the cell in the structures discussed herein is shifted to a left-center point. This is because all cells within a given row are centered along an imaginary line 104 passing through a mid-point of the cells. This facilitates in designing hybrid rows, where a hybrid row includes both short and tall cells.

In an example, due to the hybrid row discussed herein above, it may now be relatively easy to optimize (e.g., decrease) or sub-optimize distance between two cells that are interconnected, such as cells 110*b* and 115*d* that are coupled via the interconnect 802 in FIG. 8. In an example, the interconnect 802 comprises a plurality of interconnect features, such as conductive vias and lines, which extend through a frontside or above the devices of the cells (although backside interconnect features may also be possible in another example).

Figure 9:
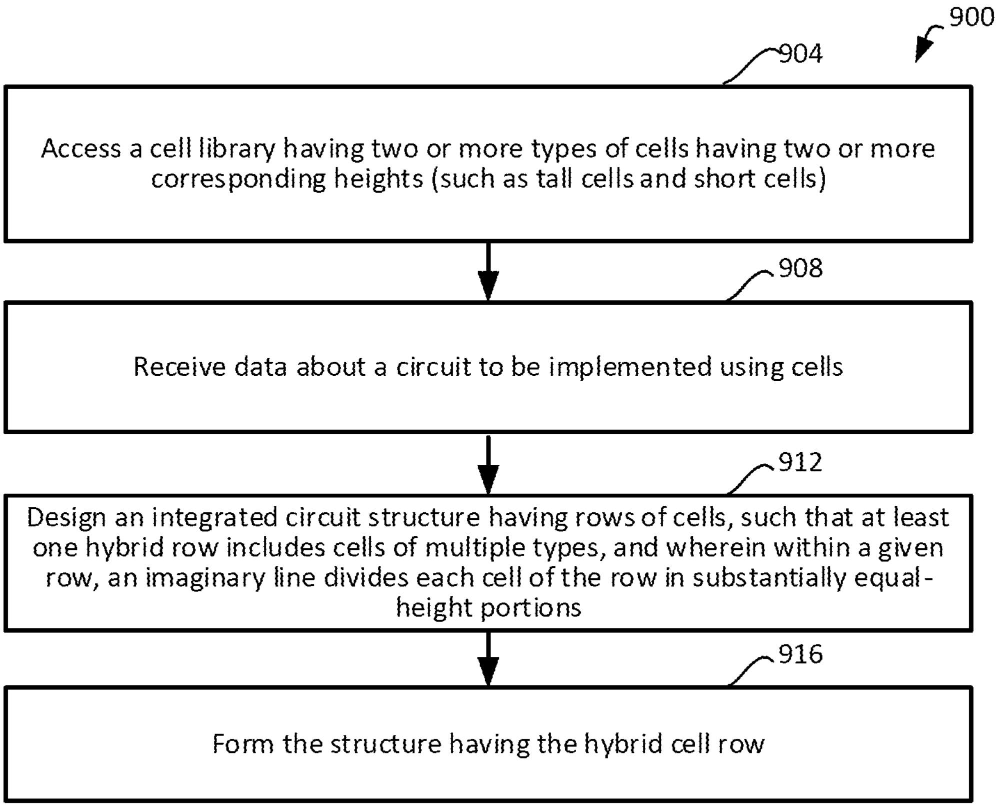
FIG. 9 illustrate a flowchart depicting a method of designing and forming any of the integrated circuit structures of FIGS. 1-8, in accordance with an embodiment of the present disclosure.

FIG. 9 illustrate a flowchart depicting a method 900 of designing and forming any of the integrated circuit structures of FIGS. 1-8, in accordance with an embodiment of the present disclosure.

In an example, a hardware computer may be used to implement one or more processes of the method 900, such as processes 904, 908, and/or 912. The hardware computer may include a hardware processor communicatively coupled to a non-transitory, computer readable storage medium that includes a set of executable instructions, when executed, can perform one or more design processes of method 900. The hardware processor is to execute the instructions within the computer readable storage medium, to perform the processes 904, 908, and/or 912 of method 900. In an example, the is a central processing unit (CPU), a graphic processing unit (GPU), a distributed processing system, an application specific integrated circuit (ASIC), and/or another appropriate processor. In an example, the computer readable storage medium is an appropriate storage medium, such as a volatile memory (e.g., DRAM), non-volatile memory (e.g., ROM), a mass storage device (such as hard disk drive, compact disk (CD), digital versatile disk (DVD), and so forth). Examples of the hardware processor and the computer readable storage medium have been discussed with respect to FIG. 10 herein below.

The method 900 includes, at 904, accessing a cell library having two or more types of cells having two or more corresponding heights, such as tall cells and short cells. An appropriate integrated circuit design tool, such as an EDA (Electronic design automation) tool being executed in the hardware computer, may be used for forming and/or accessing the cell library and for subsequent design processes.

At 908, data about a circuit to be implemented using the cells is received (e.g., by the hardware computer). At 912, an integrated circuit structure having rows of cells is designed, such that at least one hybrid row includes cells of multiple types, and wherein within a given row, an imaginary line divides each cell of the row in substantially equal-height portions, as discussed herein above in further detail. For example, the designed structure may include any of the structures 100, 600, or 700 of FIGS. 1-8. For example, the hardware computer implementing an integrated circuit design software (such as an EDA tool) generates the cell layout. The layout is usable to manufacture an integrated circuit by using a manufacturing process, and the layout is designed based on a set of design rules, at least some of which are discussed herein above.

The method 900 then proceeds from 912 to 916. At 916, the structure having the hybrid cell row is formed, e.g., using any appropriate manufacturing processes to form the integrated circuit structure designed at process 912

Note that the processes in method 900 are shown in a particular order for ease of description. However, one or more of the processes may be performed in a different order or may not be performed at all (and thus be optional), in accordance with some embodiments. Numerous variations on method 900 and the techniques described herein will be apparent in light of this disclosure.

Example System

Figure 10:
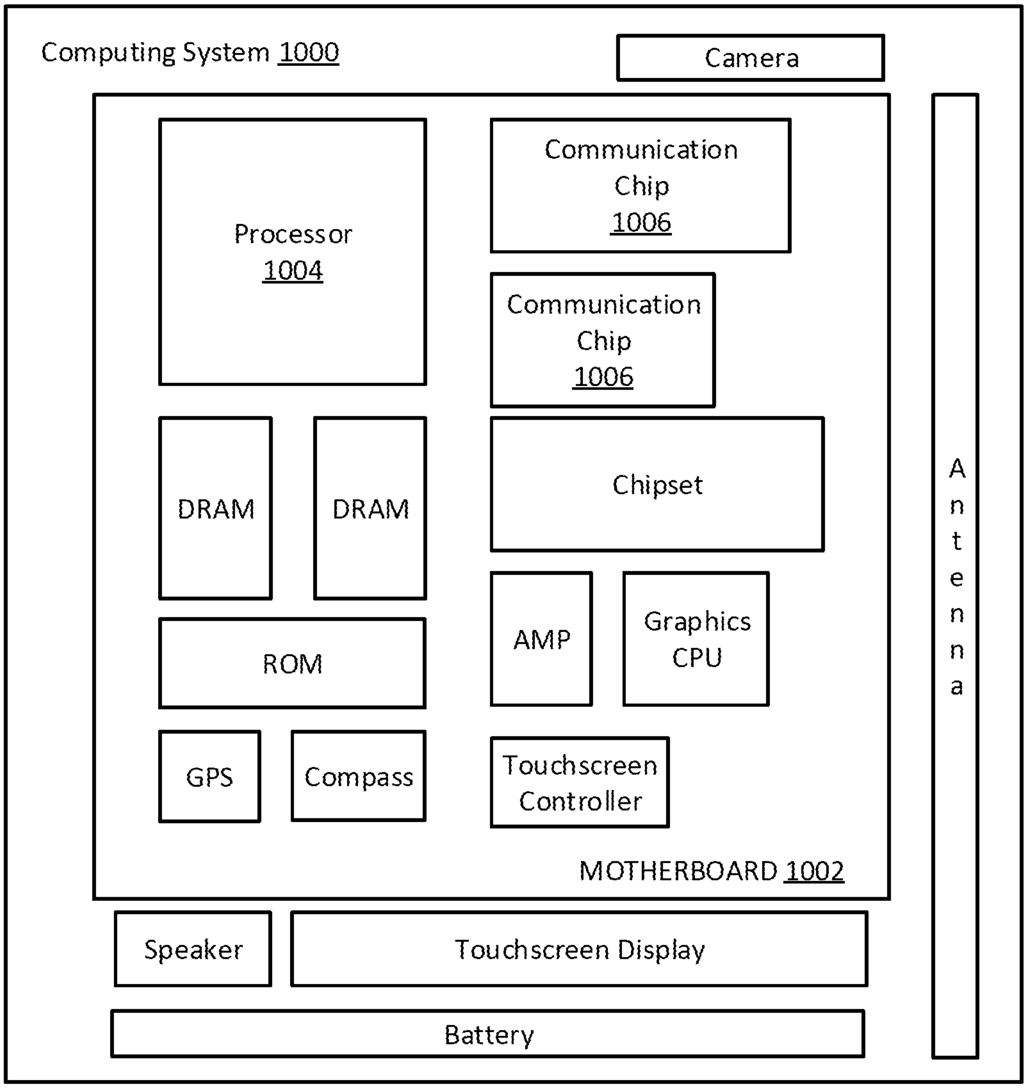
FIG. 10 illustrates a computing system implemented with integrated circuit structures (such as the integrated circuit structures illustrated in FIGS. 1-8) discussed herein and/or used to implement the design processes discussed with respect to the method of FIG. 9, in accordance with some embodiments of the present disclosure.

FIG. 10 illustrates a computing system 1000 implemented with integrated circuit structures (such as the integrated circuit structures illustrated in FIGS. 1-8) discussed herein and/or used to implement the design processes discussed with respect to the method 900 of FIG. 9, in accordance with some embodiments of the present disclosure. As can be seen, the computing system 1000 houses a motherboard 1002. The motherboard 1002 may include a number of components, including, but not limited to, a processor 1004 and at least one communication chip 1006, each of which can be physically and electrically coupled to the motherboard 1002, or otherwise integrated therein. As will be appreciated, the motherboard 1002 may be, for example, any printed circuit board, whether a main board, a daughterboard mounted on a main board, or the only board of system 1000, etc.

Depending on its applications, computing system 1000 may include one or more other components that may or may not be physically and electrically coupled to the motherboard 1002. These other components may include, but are not limited to, volatile memory (e.g., DRAM), non-volatile memory (e.g., ROM), a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth). Any of the components included in computing system 1000 may include one or more integrated circuit structures or devices formed using the disclosed techniques in accordance with an example embodiment. In some embodiments, multiple functions can be integrated into one or more chips (e.g., for instance, note that the communication chip 1006 can be part of or otherwise integrated into the processor 1004).

The communication chip 1006 enables wireless communications for the transfer of data to and from the computing system 1000. The term “wireless” and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including, but not limited to, Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing system 1000 may include a plurality of communication chips 1006. For instance, a first communication chip 1006 may be dedicated to shorter range wireless communications such as Wi-Fi and Bluetooth and a second communication chip 1006 may be dedicated to longer range wireless communications such as GPS, EDGE, GPRS, CDMA, WiMAX, LTE, Ev-DO, and others.

The processor 1004 of the computing system 1000 includes an integrated circuit die packaged within the processor 1004. In some embodiments, the integrated circuit die of the processor includes onboard circuitry that is implemented with one or more integrated circuit structures or devices formed using the disclosed techniques, as variously described herein. The term "processor" may refer to any device or portion of a device that processes, for instance, electronic data from registers and/or memory to transform that electronic data into other electronic data that may be stored in registers and/or memory.

The communication chip 1006 also may include an integrated circuit die packaged within the communication chip 1006. In accordance with some such example embodiments, the integrated circuit die of the communication chip includes one or more integrated circuit structures or devices formed using the disclosed techniques as variously described herein. As will be appreciated in light of this disclosure, note that multi-standard wireless capability may be integrated directly into the processor 1004 (e.g., where functionality of any chips 1006 is integrated into processor 1004, rather than having separate communication chips). Further note that processor 1004 may be a chip set having such wireless capability. In short, any number of processor 1004 and/or communication chips 1006 can be used. Likewise, any one chip or chip set can have multiple functions integrated therein.

In various implementations, the computing system 1000 may be a laptop, a netbook, a notebook, a smartphone, a tablet, a personal digital assistant (PDA), an ultra-mobile PC, a mobile phone, a desktop computer, a server, a printer, a scanner, a monitor, a set-top box, an entertainment control unit, a digital camera, a portable music player, a digital video recorder, or any other electronic device or system that processes data or employs one or more integrated circuit structures or devices formed using the disclosed techniques, as variously described herein. Note that reference to a computing system is intended to include computing devices, apparatuses, and other structures configured for computing or processing information.

FURTHER EXAMPLE EMBODIMENTS

The following examples pertain to further embodiments, from which numerous permutations and configurations will be apparent.

Example 1. An integrated circuit structure, comprising: a plurality of first cells, each first cell having a corresponding height that is within 1 nanometer (nm) of a first height, wherein each first cell has corresponding two or more transistor devices; and a plurality of second cells, each second cell having a corresponding height that is within 1 nm of a second height, the second height at least 3 nm smaller than the first height, wherein each second cell has corresponding two or more transistor devices; wherein the plurality of first cells and the plurality of second cells are arranged in a plurality of rows, such that (i) a row of the plurality of rows includes a first cell laterally adjacent to a second cell, (ii) an imaginary line passes through the first cell, and divides the first cell into a first upper portion having a first upper height and a first lower portion having a first lower height that are within 1 nm of each other, and (iii) the imaginary line passes also through the second cell, and divides the second cell into a second upper portion having a second upper height and a second lower portion having a second lower height that are within 1 nm of each other.

Example 2. The integrated circuit structure of example 1, wherein: the first cell comprises a first diffusion region having a first diffusion height; the second cell comprises a second diffusion region having a second diffusion height; the first and second diffusion heights are measured in the direction parallel to the first height and the second height; and the second diffusion height is at least 2 nm smaller than the first diffusion height.

Example 3. The integrated circuit structure of any one of examples 1-2, wherein: the first cell comprises a first gate structure having a first gate height; the second cell comprises a second gate structure having a second gate height; the first and second gate heights are measured in the direction parallel to the first height and the second height; and the second gate height is at least 2 nm smaller than the first gate height.

Example 4. The integrated circuit structure of any one of examples 1-3, wherein the plurality of first cells are a plurality of tall cells and the plurality of second cells are a plurality of short cells, wherein the row includes a first tall cell and a first short cell, wherein the row is a first row, and wherein the plurality of rows further comprises: a second row that includes a second short cell and a third short cell.

Example 5. The integrated circuit structure of example 4, wherein the second row doesn't include any tall cell.

Example 6. The integrated circuit structure of any one of examples 4-5, wherein the plurality of rows further comprises: a third row that includes a second tall cell and a third tall cell, and excludes any short cell.

Example 7. The integrated circuit structure of any one of examples 4-6, wherein: the first row and the second row are adjacent rows, with any intervening row between the first and second rows; the imaginary line is a first imaginary line; and a second imaginary line (i) passes through the second short cell, and divides the second short cell into a corresponding upper portion having a corresponding upper height and a corresponding lower portion having a corresponding lower height that are within 1 nm of each other, and (ii) passes through the third short cell, and divides the third short cell into a corresponding upper portion having a corresponding upper height and a corresponding lower portion having a corresponding lower height that are within 1 nm of each other.

Example 8. The integrated circuit structure of example 7, wherein: a distance between the first and second imaginary lines is equal to an average of the first and second heights, the distance measured in the direction parallel to the first and second heights.

Example 9. The integrated circuit structure of any one of examples 1-8, wherein: each row of the plurality of rows extends in a first direction that is parallel to the imaginary line; the first height and the second height are measured in a second direction that is perpendicular to the first direction; the plurality of first cells are a plurality of tall cells and the plurality of second cells are a plurality of short cells, wherein the row includes a first tall cell and a first short cell; the first short cell and a second short cell are adjacent to each other along the second direction, with dielectric material or a dummy cell between the first short cell and the second short cell.

Example 10. The integrated circuit structure of any one of examples 1-9, further comprising: a first rail conductor to supply power or ground connection to one or more transistor devices of the first cell; and a second rail conductor to supply power or ground connection to one or more transistor devices of the second cell; wherein the first rail conductor and the second rail conductor extend in direction perpendicular to the first height and the second height, and wherein the first rail conductor and the second rail conductor are colinear.

Example 11. The integrated circuit structure of example 10, wherein: the first rail conductor is above or below one or more diffusion regions of the corresponding one or more transistor devices of the first cell; and the second rail conductor is above or below one or more diffusion regions of the corresponding one or more transistor devices of the second cell.

Example 12. The integrated circuit structure of any one of examples 1-11, wherein: the height of a given cell included in the first or second pluralities is a distance between opposing first and second edges of the given cell, and length of a gate structure of a given cell extends (1) away from the first edge and toward the second edge and (2) over semiconductor regions of the two or more transistor devices of the given cell; and the gate structure includes one or more gate cuts along its length extending between the first and second edges.

Example 13. The integrated circuit structure of any one of examples 1-12, wherein a transistor of the two or more transistors of the given cell includes a source region and drain region, and a width of the gate structure extends away from the source region and toward the drain region.

Example 14. The integrated circuit structure of any one of examples 1-13, wherein each of the semiconductor regions of the two or more transistor devices comprises any of a nanoribbon, a nanowire, a nanosheet, Example 15. The integrated circuit structure of any one of examples 1-14, wherein each of the semiconductor regions of the two or more transistor devices comprises a fin.

Example 16. The integrated circuit structure of any one of examples 1-15, wherein: the height of a given cell included in the first or second pluralities is a distance between opposing first and second edges of the given cell, and length of a gate structure of a given cell extends (1) away from the first edge and toward the second edge and (2) over semiconductor regions of the two or more transistor devices of the given cell; and the first upper and lower heights of the first cell and the second upper and lower heights of the second cell are measured in a direction parallel to the first height and the second height.

Example 17. An integrated circuit designing system comprising: at least one processor; and a non-transitory storage medium storing instructions that, when executed by the at least one processor, cause the system to perform a method comprising: accessing a cell library having short cells and tall cells, wherein each short cell has a first height, wherein each tall cell has a second height, the second height at least 3 nm greater than the first height, wherein the height is measured in a direction parallel to a length of a gate structure of a short cell or a tall cell, wherein each short and tell cell comprises corresponding two or more transistor devices; receiving data about a circuit to be implemented using the short and tall cells; and designing a plurality of rows comprising the tall and short cells, to implement the circuit, such that (i) a row of the plurality of rows includes a first short cell laterally adjacent to a first tall cell, (ii) an imaginary line passes through each of the first short cell and the first tall cell, and divides each of the first short cell and the first tall cell into two substantially equal height portions.

Example 18. The integrated circuit designing system of example 17, wherein the row is a first row, and the plurality of rows further comprises: a second row having one or more short cells, but no tall cells; and a third row having one or more tall cells, but no short cells.

Example 19. The integrated circuit designing system of any one of examples 17-18, wherein the instructions cause the system to perform the method further comprising: designing a first rail conductor to supply power or ground connection to one or more transistor devices of the first short cell; and designing a second rail conductor to supply power or ground connection to one or more transistor devices of the first tall cell; wherein the first rail conductor and the second rail conductor extend in direction perpendicular to the first height and the second height, and wherein the first rail conductor and the second rail conductor are colinear.

Example 20. An integrated circuit structure, comprising: a first transistor device comprising a first source region, a first drain region, a first body comprising semiconductor material extending from the first source region to the first drain region, and a first gate structure on the first body; a second transistor device laterally adjacent to the first transistor device, the second transistor device comprising a second source region, a second drain region, a second body comprising semiconductor material extending from the second source region to the second drain region, and a second gate structure on the second body; a first rail conductor above or below the first source or drain region, and coupled to one of the first source or drain region; and a second rail conductor above or below the second source or drain region, and coupled to one of the second source or drain region; wherein a first dimension of the first source region is at least 2 nanometers greater than a second dimension of the second source region, the first and second dimensions measured in a first direction that is parallel to lengths of the first and second gate structures; and wherein the first and second rail conductors are colinear and extend in a second direction perpendicular to the first direction.

Example 21. The integrated circuit structure of example 20, wherein a first length of the first gate structure is at least 2 nanometers greater than a second length of the second gate structure.

Example 22. The integrated circuit structure of any one of examples 20-21, wherein each of the first body and the second body comprises a nanoribbon, a nanowire, a nanosheet, or a fin.

The foregoing description of example embodiments of the present disclosure has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

What is claimed is:

1. An integrated circuit structure, comprising:

a plurality of first cells, each cell of the plurality of first cells having a corresponding height that is within 1 nanometer (nm) of a first height, wherein each cell of the plurality of first cells has corresponding two or more transistor devices; and a plurality of second cells, each cell of the plurality of second cells having a corresponding height that is within 1 nm of a second height, the second height at least 3 nm smaller than the first height, wherein each cell of the plurality of second cells has corresponding two or more transistor devices;

wherein the plurality of first cells and the plurality of second cells are arranged in a plurality of rows, such that (i) a first row of the plurality of rows includes a first cell from the plurality of first cells laterally adjacent to a second cell from the plurality of second cells, (ii) a first imaginary line passes through the first cell, and divides the first cell into a first upper portion having a first upper height and a first lower portion having a first lower height that are within 1 nm of each other, (iii) the first imaginary line passes also through the second cell, and divides the second cell into a second upper portion having a second upper height and a second lower portion having a second lower height that are within 1 nm of each other, and (iv) a second row of the plurality of rows includes a third cell from the plurality of second cells and a fourth cell from the plurality of second cells directly laterally adjacent to the third cell.

2. The integrated circuit structure of claim 1, wherein:

the first cell comprises a first diffusion region having a first diffusion height;

the second cell comprises a second diffusion region having a second diffusion height;

the first and second diffusion heights are measured in the direction parallel to the first height and the second height; and the second diffusion height is at least 2 nm smaller than the first diffusion height.

3. The integrated circuit structure of claim 1, wherein:

the first cell comprises a first gate structure having a first gate height;

the second cell comprises a second gate structure having a second gate height;

the first and second gate heights are measured in the direction parallel to the first height and the second height; and the second gate height is at least 2 nm smaller than the first gate height.

4. The integrated circuit structure of claim 1, wherein the second row doesn't include any cells from the plurality of first cells.

5. The integrated circuit structure of claim 1, wherein the plurality of rows further comprises:

a third row that includes a fifth cell from the plurality of first cells and a sixth cell from the plurality of first cells directly laterally adjacent to the fifth cell.

6. The integrated circuit structure of claim 5, wherein the third row doesn't include any cells from the plurality of second cells.

7. The integrated circuit structure of claim 1, wherein:

the first row and the second row are adjacent rows, without any intervening row between the first and second rows;

the imaginary line is a first imaginary line; and a second imaginary line (i) passes through the third cell, and divides the third cell into a corresponding upper portion having a corresponding upper height and a corresponding lower portion having a corresponding lower height that are within 1 nm of each other, and (ii) passes through the fourth cell, and divides the fourth cell into a corresponding upper portion having a corresponding upper height and a corresponding lower portion having a corresponding lower height that are within 1 nm of each other.

8. The integrated circuit structure of claim 7, wherein:

a distance between the first and second imaginary lines is equal to an average of the first and second heights, the distance measured in the direction parallel to the first and second heights.

9. The integrated circuit structure of claim 1, wherein:

each row of the plurality of rows extends in a first direction that is parallel to the imaginary line;

the first height and the second height are measured in a second direction that is perpendicular to the first direction; and the second cell and the third cell are adjacent to each other along the second direction, with dielectric material or a dummy cell between the second cell and the third cell.

10. The integrated circuit structure of claim 1, further comprising:

a first rail conductor to supply power or ground connection to one or more transistor devices of the first cell; and a second rail conductor to supply power or ground connection to one or more transistor devices of the second cell;

wherein the first rail conductor and the second rail conductor extend in a direction perpendicular to the first height and the second height, and wherein the first rail conductor and the second rail conductor are colinear.

11. The integrated circuit structure of claim 10, wherein:

the first rail conductor is above or below one or more diffusion regions of the corresponding one or more transistor devices of the first cell; and the second rail conductor is above or below one or more diffusion regions of the corresponding one or more transistor devices of the second cell.

12. The integrated circuit structure of claim 1, wherein:

the height of a given cell included in the plurality of first cells or plurality of second cells is a distance between opposing first and second edges of the given cell, and length of a gate structure of a given cell extends (1) away from the first edge and toward the second edge and (2) over semiconductor regions of the two or more transistor devices of the given cell; and the gate structure includes one or more gate cuts along its length extending between the first and second edges.

13. The integrated circuit structure of claim 12, wherein a transistor of the two or more transistors of the given cell includes a source region and drain region, and a width of the gate structure extends away from the source region and toward the drain region.

14. The integrated circuit structure of claim 12, wherein the semiconductor regions of the two or more transistor devices comprises any of a nanoribbon, a nanowire, a nanosheet, or a fin.

15. The integrated circuit structure of claim 1, wherein:

the height of a given cell included in the plurality of first cells or plurality of second cells is a distance between opposing first and second edges of the given cell, and the length of a gate structure of the given cell extends (1) away from the first edge and toward the second edge and (2) over semiconductor regions of the two or more transistor devices of the given cell; and the first upper and lower heights of the first cell and the second upper and lower heights of the second cell are measured in a direction parallel to the first height and the second height.

16. An integrated circuit designing system comprising:

at least one processor; and a non-transitory storage medium storing instructions that, when executed by the at least one processor, cause the system to perform a method comprising:

accessing a cell library having a plurality of first cells and a plurality of second cells, wherein each cell of the plurality of first cells has a first height, wherein each cell of the plurality of second cells has a second height, the second height at least 3 nm less than the first height, wherein the height is measured in a direction parallel to a length of a gate structure of a cell from the plurality of first cells or the plurality of second cells, wherein each cell from the plurality of first cells and the plurality of second cells comprises corresponding two or more transistor devices;

receiving data about a circuit to be implemented using the plurality of first cells and the plurality of second cells; and designing a plurality of rows comprising the plurality of first cells and the plurality of second cells, to implement the circuit, such that (i) a first row of the plurality of rows includes a first cell from the plurality of first cells laterally adjacent to a second cell from the plurality of second cells, (ii) an imaginary line passes through each of the first cell and the second cell, and divides each of the first cell and the second cell into two substantially equal height portions, (iii) a second row of the plurality of rows includes one or more cells from the plurality of first cells and does not include any cells from the plurality of second cells, and (iv) a third row of the plurality of rows includes one or more cells from the plurality of second cells and does not include any cells from the plurality of first cells.

17. The integrated circuit designing system of claim 16, wherein the instructions cause the system to perform the method further comprising designing a first rail conductor to supply power or ground connection to one or more transistor devices of the first cell; and designing a second rail conductor to supply power or ground connection to one or more transistor devices of the second cell;

wherein the first rail conductor and the second rail conductor extend in a direction perpendicular to the first height and the second height, and wherein the first rail conductor and the second rail conductor are colinear.

18. An integrated circuit structure, comprising:

a first transistor device comprising a first source region, a first drain region, a first body comprising semiconductor material extending from the first source region to the first drain region, and a first gate structure on the first body;

a second transistor device laterally adjacent to the first transistor device, the second transistor device comprising a second source region, a second drain region, a second body comprising semiconductor material extending from the second source region to the second drain region, and a second gate structure on the second body;

a first rail conductor above or below the first source or drain region, and coupled to one of the first source or drain region; and a second rail conductor above or below the second source or drain region, and coupled to one of the second source or drain region;

wherein a first dimension of the first source region is at least 2 nanometers greater than a second dimension of the second source region, the first and second dimensions measured in a first direction that is parallel to lengths of the first and second gate structures; and wherein the first and second rail conductors are colinear and extend in a second direction perpendicular to the first direction, and wherein the first and second rail conductors are physically separate from each other.

19. The integrated circuit structure of claim 18, wherein a first length of the first gate structure is at least 2 nanometers greater than a second length of the second gate structure.

20. The integrated circuit structure of claim 18, wherein each of the first body and the second body comprises a nanoribbon, a nanowire, a nanosheet, or a fin.

21. The integrated circuit structure of claim 18, wherein the first rail conductor extends in the second direction directly above or directly below the first source or drain region, and the second rail conductor extends in the second direction directly above or directly below the second source or drain region.

* * * * *